(12) United States Patent
Yamauchi et al.

(10) Patent No.: US 9,836,246 B2
(45) Date of Patent: Dec. 5, 2017

(54) STORAGE MANAGEMENT DEVICE, PERFORMANCE ADJUSTMENT METHOD, AND COMPUTER-READABLE RECORDING MEDIUM

(71) Applicant: FUJITSU LIMITED, Kawasaki-shi, Kanagawa (JP)

(72) Inventors: Takahiro Yamauchi, Numazu (JP); Toshiharu Makida, Numazu (JP); Kiyoshi Sugioka, Mishima (JP); Joichi Bita, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 147 days.

(21) Appl. No.: 14/936,746

(22) Filed: Nov. 10, 2015

(65) Prior Publication Data

US 2016/0170650 A1 Jun. 16, 2016

(30) Foreign Application Priority Data

Dec. 15, 2014 (JP) .................................. 2014-253162

(51) Int. Cl.
*G06F 3/06* (2006.01)
*G06F 9/455* (2006.01)
(Continued)

(52) U.S. Cl.
CPC ............ *G06F 3/0653* (2013.01); *G06F 3/061* (2013.01); *G06F 3/0635* (2013.01);
(Continued)

(58) Field of Classification Search
None
See application file for complete search history.

(56) References Cited

U.S. PATENT DOCUMENTS 6,404,777 B1 *  6/2002  Hattori ................ H04L 12/2602
                                                        370/231
2003/0093619 A1 *  5/2003  Sugino ................... G06F 3/0605
                                                        711/114
(Continued)

FOREIGN PATENT DOCUMENTS

JP          6-250795          9/1994
JP          2004-199697       7/2004
(Continued)

*Primary Examiner* — Mano Padmanabhan
*Assistant Examiner* — Jean Edouard
(74) *Attorney, Agent, or Firm* — Fujitsu Patent Center

(57) ABSTRACT

A guarantee value setting unit stores therein a guarantee value of data send/receive performance with respect to a predetermined volume in a plurality of volumes held by a storage device. A bandwidth management unit calculates an interim target value on the basis of a comparison result between the guarantee value and an actual measurement value of the data send/receive performance with respect to the predetermined volume, allocates, on the basis of the interim target value, a bandwidth that compensates a difference between the guarantee value and the actual measurement value with respect to the predetermined storage area, and determines band distribution with respect to each of the volumes, and instructs the storage device to adjust the bandwidth in accordance with the determined band distribution.

6 Claims, 17 Drawing Sheets

US 9,836,246 B2
Page 2

(51) Int. Cl.
*G06F 13/00* (2006.01)
*H04L 12/823* (2013.01)

(52) U.S. Cl.
CPC ............ *G06F 3/0689* (2013.01); *G06F 9/455* (2013.01); *G06F 13/00* (2013.01); *H04L 47/32* (2013.01)

(56) References Cited

U.S. PATENT DOCUMENTS

| | | | |
|---|---|---|---|
| 2004/0122938 | A1 | 6/2004 | Messick et al. |
| 2005/0138285 | A1* | 6/2005 | Takaoka .................. G06F 3/061 711/114 |
| 2005/0154852 | A1* | 7/2005 | Nakagawa ............ G06F 3/0605 711/170 |
| 2006/0072608 | A1 | 4/2006 | Miyawaki et al. |
| 2006/0095656 | A1* | 5/2006 | Ueoka ................ H04L 67/1097 711/111 |
| 2008/0162810 | A1* | 7/2008 | Taguchi .................. G06F 3/061 711/114 |
| 2009/0003329 | A1* | 1/2009 | Murakami .............. H04L 47/10 370/389 |
| 2009/0150639 | A1* | 6/2009 | Ohata ................... G06F 3/0608 711/172 |
| 2010/0088280 | A1 | 4/2010 | Satoyama et al. |
| 2011/0103255 | A1* | 5/2011 | Ikeda ...................... H04L 45/00 370/252 |
| 2012/0166748 | A1 | 6/2012 | Satoyama et al. |
| 2012/0170475 | A1* | 7/2012 | Srebranig ............. H04L 47/824 370/252 |
| 2012/0185645 | A1* | 7/2012 | Nakagawa .......... G06F 11/2069 711/114 |
| 2012/0266011 | A1 | 10/2012 | Storer et al. |
| 2012/0266177 | A1* | 10/2012 | Kakeda ................... G06F 3/067 718/104 |
| 2013/0185482 | A1 | 7/2013 | Kim et al. |
| 2013/0219136 | A1* | 8/2013 | Nakamura .............. G06F 3/061 711/162 |
| 2013/0258926 | A1* | 10/2013 | Osakada ............... H04W 52/04 370/311 |
| 2013/0290529 | A1 | 10/2013 | Gordon et al. |
| 2013/0326515 | A1* | 12/2013 | Hara ...................... G06F 9/455 718/1 |
| 2014/0006350 | A1 | 1/2014 | Fukui et al. |

FOREIGN PATENT DOCUMENTS

| | | |
|---|---|---|
| JP | 2006-108955 | 4/2006 |
| JP | 2010-079526 | 4/2010 |
| JP | 2013-536478 | 9/2013 |
| JP | 2014-010465 | 1/2014 |
| JP | 2014-506367 | 3/2014 |
| JP | 2014-132457 | 7/2014 |
| JP | 2014-517952 | 7/2014 |
| WO | 2012090247 | 7/2012 |
| WO | 2012104847 | 8/2012 |
| WO | 2012142027 | 10/2012 |

* cited by examiner

| VOLUME IDENTIFICATION INFORMATION | GUARANTEE PERFORMANCE | TYPE | BANDWIDTH |
|---|---|---|---|
| Storage=1, VolNo=1 | 10 | GUARANTEE | 10MB/s, 100IOPS |
| Storage=1, VolNo=2 | - | - | 20MB/s, 200IOPS |
| Storage=2, VolNo=1 | 20 | GUARANTEE | 15MB/s, 150IOPS |
| Storage=1, VolNo=2 | 10 | GUARANTEE | 100MB/s, 500IOPS |

| PERFORMANCE MEASUREMENT DATE AND TIME | VOLUME IDENTIFICATION INFORMATION | ACTUAL MEASUREMENT PERFORMANCE RESPONSE TIME | ACTUAL MEASUREMENT THROUGHPUT | ACTUAL MEASUREMENT IOPS | ACTUAL MEASUREMENT CACHE HIT RATE | ACTUAL MEASUREMENT DELAY TIME |
|---|---|---|---|---|---|---|
| 20110101000000-20110101000030 | Storage=1, VolNo=1 | 10ms | 12MB/s | 100IOPS | 10% | 0ms |
| 20110101000000-20110101000030 | Storage=1, VolNo=2 | 11ms | 9MB/s | 100IOPS | 9% | 1ms |
| 20110101000000-20110101000030 | Storage=2, VolNo=1 | 12ms | 8MB/s | 100IOPS | 8% | 2ms |
| 20110101000000-20110101000030 | Storage=2, VolNo=2 | 13ms | 7MB/s | 100IOPS | 7% | 3ms |
| 20110101000030-20110101000100 | Storage=1, VolNo=1 | 11ms | 11MB/s | 110IOPS | 10% | 0ms |
| 20110101000030-20110101000100 | Storage=1, VolNo=2 | 12ms | 10MB/s | 120IOPS | 9% | 1ms |
| 20110101000030-20110101000100 | Storage=2, VolNo=1 | 13ms | 9MB/s | 130IOPS | 8% | 2ms |
| 20110101000030-20110101000100 | Storage=2, VolNo=2 | 14ms | 8MB/s | 140IOPS | 7% | 3ms |

| PERFORMANCE MEASUREMENT DATE AND TIME | RESOURCE TYPE | RESOURCE IDENTIFICATION INFORMATION | BUSY RATE |
|---|---|---|---|
| 20111010100000000-20111010100000030 | CPU | Storage=1, CM#0 | 10% |
| 20111010100000000-20111010100000030 | FC SWITCH | Switch=1, Port#0 | 11% |
| 20111010100000000-20111010100000030 | RAID GROUP | Storage=1, RAIDG#1 | 12% |
| 20111010100000030-20111010100000100 | CPU | Storage=1, CM#0 | 11% |
| 20111010100000030-20111010100000100 | FC SWITCH | Switch=1, Port#0 | 12% |
| 20111010100000030-20111010100000100 | RAID GROUP | Storage=1, RAIDG#1 | 13% |

| 1ST MEASU-REMENT | 2ND MEASU-REMENT | 3RD MEASU-REMENT | 4TH MEASU-REMENT | 5TH MEASU-REMENT | 6TH MEASU-REMENT | 7TH MEASU-REMENT | 8TH MEASU-REMENT | 9TH MEASU-REMENT | 10TH MEASU-REMENT |
|---|---|---|---|---|---|---|---|---|---|
| 10 | 7 | 8 | 12 | 7 | 11 | 10 | 10 | 8 | 9 |

FIG.11

GUARANTEE TYPE
■GUARANTEE AVERAGE PERFORMANCE
□GUARANTEE DEVIATION RATE EQUAL TO
 OR LESS THAN [10%] FROM TARGET
 PERFORMANCE

FIG.12

TARGET PERFORMANCE | RESPONSE TIME [MS] | 10

▲ADVANCED SETTING
 ●GUARANTEED VOLUME   ○SACRIFICE VOLUME

| VOLUME IDENTIFICATION INFORMATION | TARGET/ GUARANTEE PERFORMANCE | TYPE | BANDWIDTH |
|---|---|---|---|
| Storage=1, VolNo=1 | 10 | GUARANTEE | 10MB/s, 100IOPS |
| Storage=1, VolNo=2 | - | SACRIFICE | 20MB/s, 200IOPS |
| Storage=2, VolNo=1 | 20 | GUARANTEE | 15MB/s, 150IOPS |
| Storage=1, VolNo=2 | 10 | GUARANTEE | 100MB/s, 500IOPS |

| PERFORMANCE SET VALUE | IOPS | MB/s |
|---|---|---|
| 0 | UNLIMITED | UNLIMITED |
| 1 | 15,000 | 800 |
| 2 | 12,600 | 700 |
| 3 | 10,020 | 600 |
| 4 | 7,500 | 500 |
| 5 | 5,040 | 400 |
| 6 | 3,000 | 300 |
| 7 | 1,020 | 200 |
| 8 | 780 | 100 |
| 9 | 600 | 70 |
| 10 | 420 | 40 |
| 11 | 300 | 25 |
| 12 | 240 | 20 |
| 13 | 180 | 15 |
| 14 | 120 | 10 |
| 15 | 60 | 5 |

STORAGE MANAGEMENT DEVICE, PERFORMANCE ADJUSTMENT METHOD, AND COMPUTER-READABLE RECORDING MEDIUM

CROSS-REFERENCE TO RELATED APPLICATION

This application is based upon and claims the benefit of priority of the prior Japanese Patent Application No. 2014-253162, filed on Dec. 15, 2014, the entire contents of which are incorporated herein by reference.

FIELD

The embodiments discussed herein are directed to a storage management device, a performance adjustment method, and a computer-readable recording medium.

BACKGROUND

In recent years, with the virtualization of open systems and servers, management of systems is becoming complicated. Consequently, using storage systems becomes common from the viewpoint of easily managing the systems or flexibly coping with a rapid increase in amount of data.

In the storage systems, disks with different speeds can be used. For example, examples of the disks include solid state disks (SSDs), serial attached small computer system interface hard disk drives (SAS HDDs), serial advanced technology attachment (SATA) HDDs, and the like.

In such a storage system, there may be a case in which several types of disks that have different speeds are used in the storage system and a storage area that is referred to as a single volume is created. Furthermore, for disks with different speeds in a single volume, a technology of tiering storage in an automated way, in which a storage location of data is determined in accordance with the frequency of use has been widely used.

If the technology of tiering storage in an automated way is used, for example, data that is frequently used is stored in a high speed disk in a volume, whereas data that is less frequently used is stored in a low speed disk in the volume. Then, due to automated storage tiering, it is possible to implement high-capacity high-speed storage devices at low cost.

Furthermore, as a technology of adjusting the performance of storage, for example, the band width of a data transfer path between a volume and a server that executes an application is adjusted. This function is sometimes referred to as the Quality of Service (QoS).

Furthermore, as a technology of adjusting the performance of storage, for example, there is a conventional technology of allocating a node such that a service level requirement is satisfied when a task is performed. Furthermore, there is a conventional technology of allocating a pool area to a virtual volume in accordance with a system requirement. Furthermore, there is a conventional technology of customizing a combination of storage devices so as to implement desired performance. Furthermore, there is a conventional technology of changing, on the basis of a system requirement, a logical container that corresponds to the storage destination of data. Furthermore, there is a conventional technology of selecting, from a plurality of pieces of storage/clouds on the basis of the attribute of a file and the attribute of the storage destination, storage/cloud that stores therein a file that satisfies the system requirement.

Patent Document 1: Japanese National Publication of International Patent Application No. 2014-506367
Patent Document 2: Japanese National Publication of International Patent Application No. 2013-536478
Patent Document 3: Japanese Laid-open Patent Publication No. 2014-132457
Patent Document 4: Japanese National Publication of International Patent Application No. 2014-517952
Patent Document 5: Japanese Laid-open Patent Publication No. 2014-10465

However, if the bandwidth is adjusted such that the actual measurement performance matches the target performance, because the actual measurement performance varies due to variation in load, it is difficult to continuously and completely match both the actual measurement performance and the target performance. Accordingly, because adjustment is repeatedly performed such that the target performance matches with the actual measurement performance in accordance with the actual measurement performance, it is difficult to stably operate the system.

Furthermore, with the conventional technology of allocating a node in accordance with a system requirement, because the adjustment of the bandwidth is not considered, it is difficult to implement a stable operation of a system when the bandwidth is adjusted. This also applies to the conventional technologies of allocating a pool area, adjusting a combination of storage devices, changing the placement of a logical container that is the storage destination of data, and selecting storage/cloud.

SUMMARY

According to an aspect of an embodiment, a storage management device includes: a storing unit that stores therein a guarantee value of data send/receive performance with respect to a predetermined storage area in a plurality of storage areas held by a storage device; and a bandwidth management unit that calculates, on the basis of a comparison result between the guarantee value and an actual measurement value of the data send/receive performance with respect to the predetermined storage area, an interim target value, that allocates, on the basis of the interim target value, a bandwidth that compensates a difference between the guarantee value and the actual measurement value with respect to the predetermined storage area, that determines band distribution with respect to each of the plurality of storage areas, and that instructs the storage device to adjust the bandwidth in accordance with the determined band distribution.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a schematic diagram illustrating an example of a QoS setting table;

FIG. 5 is a schematic diagram illustrating an example of a volume performance information file;

FIG. 6 is a schematic diagram illustrating an example of a resource performance information file;

FIG. 11 is a schematic diagram illustrating an example of a guarantee type selection screen;

FIG. 12 is a schematic diagram illustrating an example of a volume type setting screen;

FIG. 13 is a schematic diagram illustrating an example of a QoS setting table according to a second embodiment;

DESCRIPTION OF EMBODIMENTS

Preferred embodiments of the present invention will be explained with reference to accompanying drawings. The storage management device, the performance adjustment method, and the performance adjustment program disclosed in the present invention are not limited to the embodiments described below.

[a] First Embodiment

Figure 1:
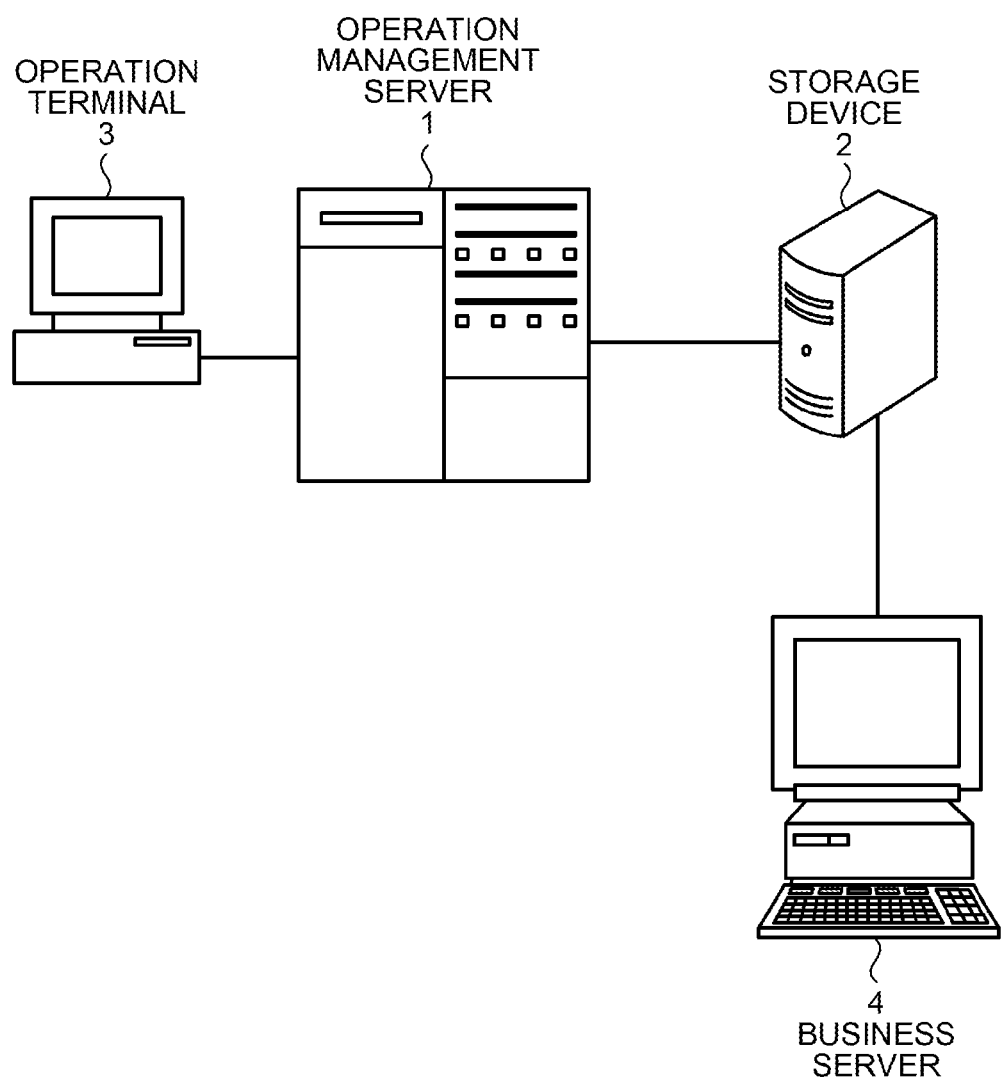
FIG. 1 is a schematic diagram illustrating, in outline, the configuration of a storage system.

FIG. 1 is a schematic diagram illustrating, in outline, the configuration of a storage system. As illustrated in FIG. 1, a storage system according to a first embodiment includes an operation management server 1, a storage device 2, an operation terminal 3, and a business server 4. Here, in FIG. 1, the single storage device 2 is illustrated; however, the number of the storage devices 2 is not limited. Furthermore, only the single business server 4 is illustrated; however, the number of the business servers 4 is not limited.

The operation terminal 3 is connected to the operation management server 1 via a network. The operation terminal 3 sends an instruction about a process to be performed on the storage device 2 to the operation management server 1. Furthermore, the operation terminal 3 displays, for example, a message sent from the operation management server 1 on a monitor and notifies an operator of the message. Furthermore, the operation terminal 3 displays an input screen of guarantee response time, which will be described later, on a display device, such as a monitor or the like.

The operation management server 1 operates and manages storage device 2. The operation management server 1 executes a QoS control program or a storage management program. The operation management server 1 corresponds to an example of a "storage management device".

Specifically, the operation management server 1 performs QoS control or the like in the storage device 2. The QoS mentioned here is a performance setting function that is used for the storage device 2 to maintain the stable performance and that adjusts a bandwidth of a volume, which will be described later. Furthermore, the operation management server 1 controls the storage device 2 in accordance with a command that is input from the operation terminal 3. For example, the operation management server 1 instructs the storage device 2 to configure the RAID that is input from the operation terminal 3.

In response to an instruction received from an application that is running on the business server 4, the storage device 2 reads or writes data by using the QoS. Furthermore, in response to an instruction received from the operation management server 1 indicating the adjustment of the bandwidth of a volume, the storage device 2 controls the QoS.

In response to an instruction received from an application that is running on the business server 4, the storage device 2 reads or writes data by using the QoS. Furthermore, in response to an instruction received from the operation management server 1 indicating, for example, the adjustment of the bandwidth of a volume, the distribution ratio of the disks, or the like, the storage device 2 controls the QoS.

The business server 4 executes a business application. When the business server 4 executes the application, the business server 4 reads or writes data from or to the storage device 2. The application executed by the business server 4 is not particularly limited as long as the application that sends and receives data to and from the storage device 2.

Figure 2:
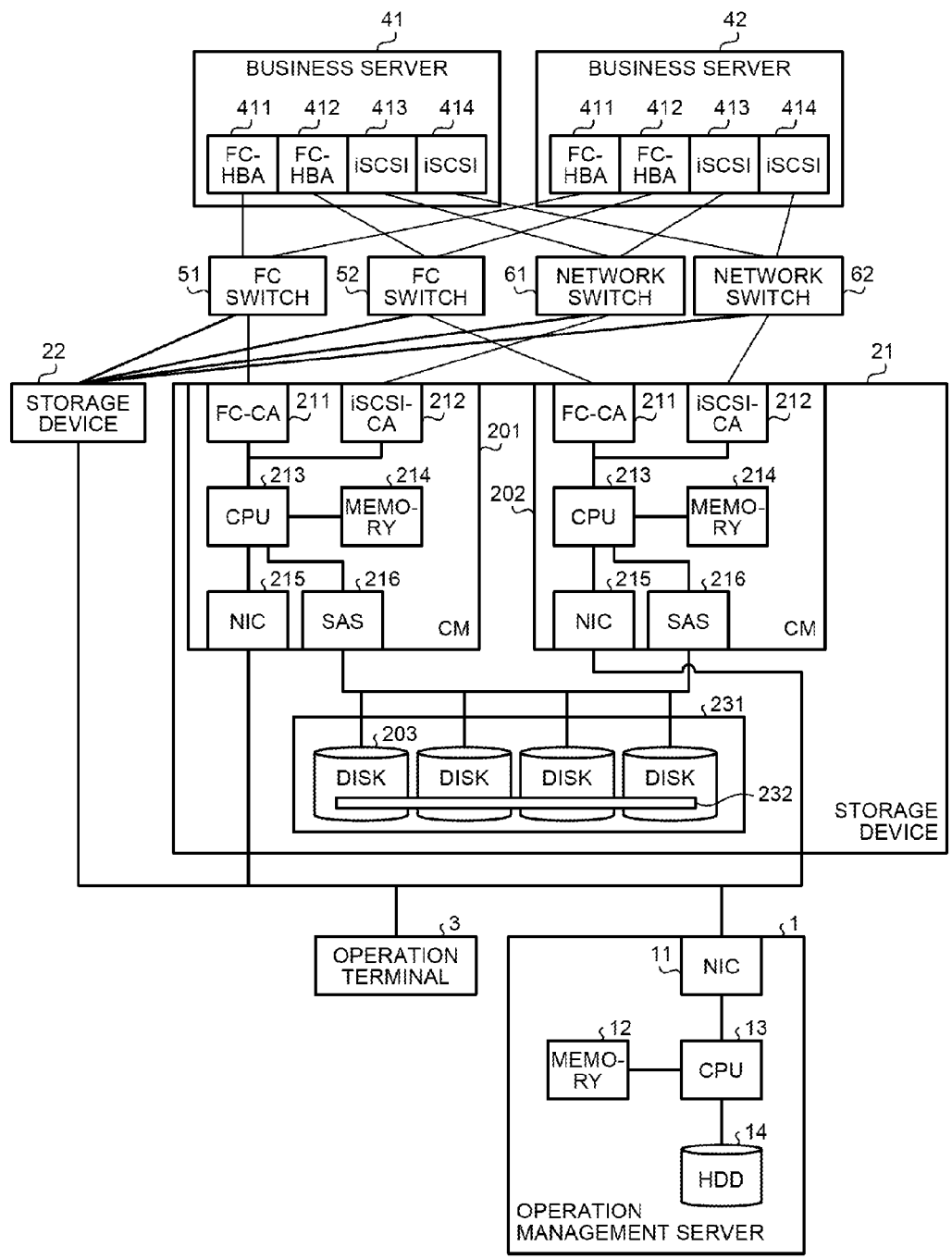
FIG. 2 is a schematic diagram illustrating the hardware configuration of the storage system.

FIG. 2 is a schematic diagram illustrating the hardware configuration of the storage system. FIG. 2 illustrates the state in which storage devices 21 and 22 are arranged as the storage device 2. Furthermore, FIG. 2 illustrates the state in which business servers 41 and 42 are arranged as the business server 4.

The business server 4 includes fiber channel-host bus adapters (FC-HBAs) 411 and 412 and internet small computer system interfaces (iSCSIs) 413 and 414. Here, in the first embodiment, the two FC-HBAs 411 and 412 are illustrated; however, any number of FC-HBAs may also be installed in the business server 4. Furthermore, the two iSCSIs 413 and 414 are illustrated; however, any number of iSCSIs may also be installed in the business server 4.

The FC-HBAs 411 and 412 are communication interfaces for data communication performed by using a fiber channel. The FC-HBAs 411 and 412 are connected to FC switches 51 and 52, respectively.

The iSCSIs 413 and 414 are communication interfaces for data communication conforming to the iSCSI standard. The iSCSIs 413 and 414 are connected to network switches 61 and 62, respectively.

The FC switches 51 and 52 relay communication between the storage device 2 and the business server 4 performed by using fiber channels. The FC switches 51 and 52 connect the FC-HBAs 411 and 412 to FC-channel adapters (CAs) 211, respectively.

The network switches 61 and 62 relay communication between the storage device 2 and the business server 4 by using the iSCSIs. The network switches 61 and 62 connect the iSCSIs 413 and 414 to iSCSI-CAs 212.

The storage device 2 includes controller modules (CMs) 201 and 202 and disks 203.

The CMs 201 and 202 have the same configuration. Accordingly, in the following, a description will be given of the CM 201 as an example.

The CM 201 includes the FC-CA 211, the iSCSI-CA 212, a central processing unit (CPU) 213, a memory 214, a network interface card (NIC) 215, and a serial attached SCSI (SAS) 216.

The FA-CA 211, the iSCSI-CA 212, the memory 214, the NIC 215, and the SAS 216 are connected to the CPU 213.

The CPU 213 sends and receives data to and from the business server 4 via the FC-CA 211 and the iSCSI-CA 212.

Furthermore, the CPU 213 performs the reading and the writing of data from and to the disks 203 via the SAS 216.

Furthermore, the CPU 213 performs communication between the operation terminal 3 and the operation management server 1 via the NIC 215. For example, when the CPU 213 receives an instruction to adjust the bandwidth, which will be described later, from the operation management server 1, the CPU 213 adjusts the bandwidth of volumes 232 in accordance with the instruction.

A plurality number of the disks 203 is mounted on the storage device 2. In FIG. 2, a RAID group 231 is formed by the plurality number of the disks 203. Furthermore, the RAID group 231 includes the plurality of the volumes 232. The volumes 232 are logical volumes. The volumes 232 correspond to an example of "storage areas". However, the configuration is not limited to the embodiment; the RAID group 231 may not also be structured.

In the following, a description will be given of the writing and the reading of data performed by the CPU 213. The CPU 213 receives, from a business application running on the business server 4, a read command that is an instruction to read data or a write command that is an instruction to write data. At this point, the read command or the write command is sent to the CPU 213 via, for example, the port of the FC switch 51 and the port of the FC-CA 211. Then, the CPU 213 performs the reading or the writing of data from or to the disks 203 in the volumes 232 in accordance with the received command. At this point, the data is written to or read from the volumes 232 in accordance with the configuration of the RAID group. Furthermore, here, a description has been given of a case in which the CPU 213 in the CM 201 reads and writes data; however, the same process is also performed in the CPU 213 in the CM 202.

Namely, in data transfer in which data is written or read, contention occurs in a port of the FC switch 51, in a port of the FC-CA 211 or the iSCSI-CA 212, in the CPU 213 that functions as the processing processor that performs a process on the data, and in the volumes 232.

If contention occurs in each of the resources at the time of data transfer, the performance of the data transfer is decreased. Accordingly, in a transmission path that is used by the resources in which contention occur, by adjusting the bandwidth of the volumes 232 that uses the transmission path, the contention occurring in the resources can be eliminated and thus the performance of the data transfer can be maintained in a high state. Thus, in the following, adjustment of the bandwidth of the volumes 232 will be described. In a description below, the description will be given of a case in which the business server 4 and the storage device 2 are connected via the FC switch 51. Furthermore, in a description below, the description will be given of the volume 232 as a unit of the band adjustment; however, the unit of the band adjustment is not limited thereto but may also be the entirety of, for example, the RAID group 231 or the storage device 2.

Furthermore, the operation management server 1 includes a network interface and (NIC) 11, a memory 12, a CPU 13, and a hard disk drive (HDD) 14. The CPU 13 executes various kinds programs stored in the HDD 14 by using the memory 12. Furthermore, the CPU 13 performs communication with the CM 201 and the CM 202 in the storage device 21 via the NIC 11.

Figure 3:
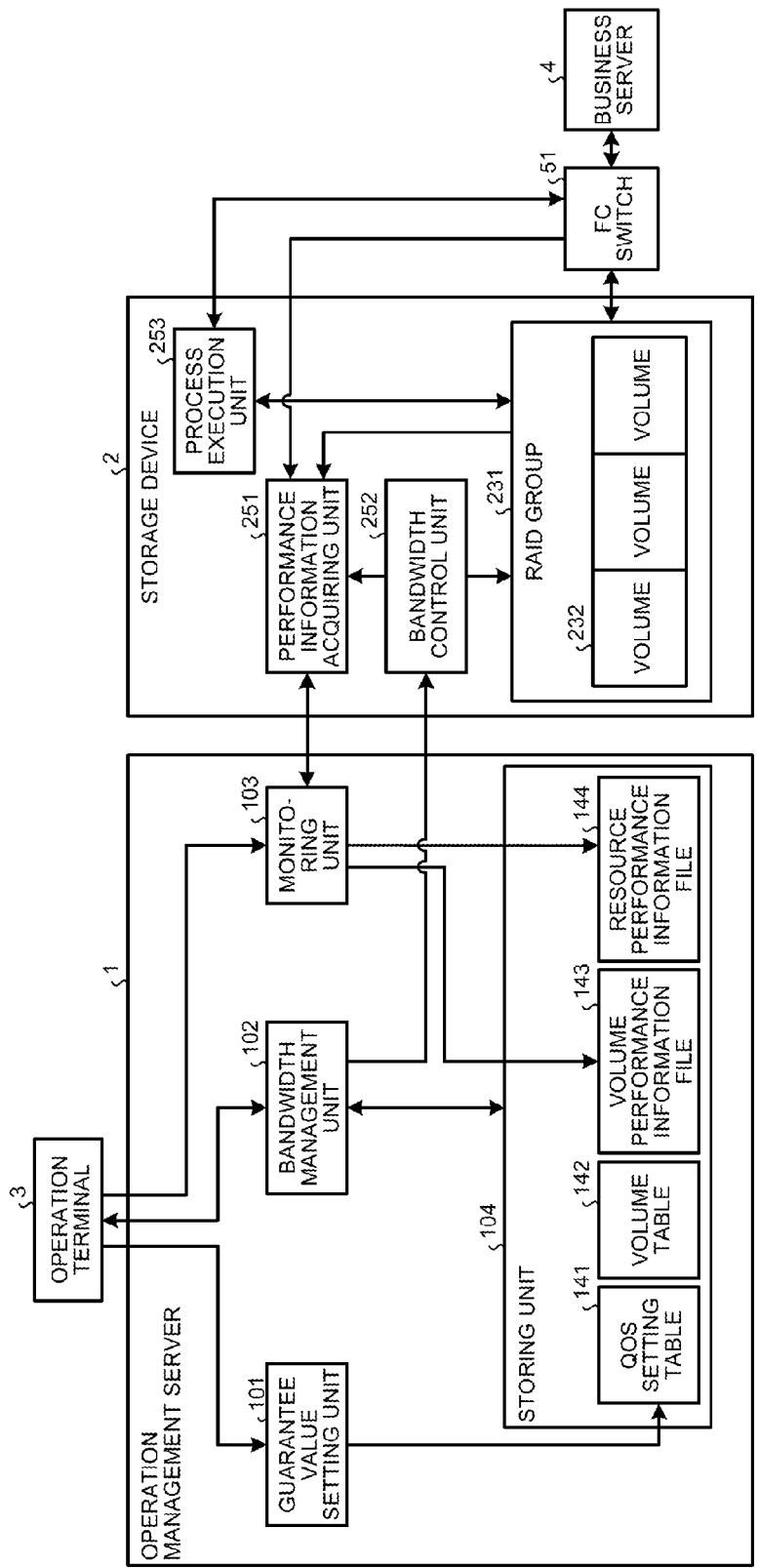
FIG. 3 is a block diagram illustrating an operation management server and a storage device according a first embodiment.

FIG. 3 is a block diagram illustrating an operation management server and a storage device according a first embodiment. The operation management server 1 includes a guarantee value setting unit 101, a bandwidth management unit 102, a monitoring unit 103, and a storing unit 104. Furthermore, the storage device 2 includes a performance information acquiring unit 251, a bandwidth control unit 252, and a process execution unit 253.

The storing unit 104 has a predetermined information storage area that stores therein each of a QoS setting table 141, a volume table 142, a volume performance information file 143, and a resource performance information file 144. Furthermore, the information storage area does not need to store therein each of the tables themselves but may also store therein information that is used to create a table when control is performed. The function of the storing unit 104 is implemented by, for example, the HDD 14 illustrated in FIG. 2.

FIG. 4 is a schematic diagram illustrating an example of a QoS setting table. In the first embodiment, in the QoS setting table 141, volume identification information, the guarantee performance, the type, and the bandwidth are registered in an associated manner.

The volume identification information is information for uniquely specifying the volumes 232. In the first embodiment, the volume identification information is represented by both the number allocated to the storage device 2 and the number allocated to the volumes 232. For example, if it is assumed that the storage device 21 illustrated in FIG. 2 is No. 1 and the storage device 22 illustrated in FIG. 2 is No. 2, "Storage=1,VolNo=1" indicates the volume 232 in the storage device 21 with the volume number of 1.

Furthermore, the guarantee performance indicates the response time guaranteed with respect to the volume 232 that has the associated volume identification information. Furthermore, the type indicates whether the volume 232 that has the associated volume identification information is the volume 232 in which the response time is guaranteed or the volume 232 in which the response time is not guaranteed. In a description below, the volume 232 in which the response time is guaranteed is referred to as a "guaranteed volume". Furthermore, the volume 232 in which the response time is not guaranteed is referred to as a "non-guaranteed volume".

Furthermore, the bandwidth is a bandwidth that is set in the volume 232 that stores therein the associated volume identification information. In FIG. 4, the bandwidth is represented by two types: an amount of data per second (MB Per Second) that represents the throughput and the number of read/write operations (Input Output Per Second: IOPS).

The volume table 142 indicates the resources used by each of the volumes 232. Namely, the volumes 232 indicated by the volume identification information use the processing processor, the port number, the switch port, and the RAID group associated in the volume table 142.

FIG. 5 is a schematic diagram illustrating an example of a volume performance information file. In the volume performance information file 143, information indicating the performance of the actual measurement of each of the volumes 232 is registered. In the first embodiment, in the volume performance information file 143, in addition to the performance measurement date and time, the volume identification information, the actual measurement response time, the actual measurement throughput, the actual measurement IOPS, the actual measurement cache hit rate and the actual measurement delay time are registered in an associated manner. In the description below, the volume identification information, the actual measurement response time, the actual measurement throughput, the actual measurement IOPS, the actual measurement cache hit rate, and the actual measurement delay time may sometimes be collectively referred to as "performance information on a volume".

The actual measurement response time is the response time measured when data is read from and written to the volume 232 that includes therein the associated volume identification information. The actual measurement throughput is the throughput measured when data is read from and written to the volume 232 that includes therein the associated volume identification information. The actual measurement IOPS is the IOPS measured when data is read from and written to the volume 232 that includes therein the associated volume identification information. The actual measurement cache hit rate is the cache hit rate measured when data is read from and written to the volume 232 that includes therein the associated volume identification information. The actual measurement delay time is the delay time measured when data is read from and written to the volume 232 that includes therein the associated volume identification information.

FIG. 6 is a schematic diagram illustrating an example of a resource performance information file. The resource performance information file 144 indicates the actual performance of each of the resources. In the first embodiment, in the resource performance information file 144, in addition to the performance measurement date and time, the resource type, the resource identification information, and the Busy rate are registered in an associated manner.

The resource identification information is information for uniquely specifying the resources. The resource type is the type of the resources specified by the resource identification information. The Busy rate is a load ratio of the resource specified by the resource identification information.

A description will be continued here by referring back to FIG. 3. An operator determines the volume 232 in which the performance is guaranteed. Furthermore, the operator determines, with respect to the volume 232 in which the performance is guaranteed, the guarantee response time that is used to guarantee the degree of performance.

The guarantee value setting unit 101 receives, from the operation terminal 3, an input of the guarantee response time that is input by an operator with respect to the volume 232. Namely, the volume 232 in which the guarantee response time is set by the operator becomes a guaranteed volume and the volume 232 in which the guarantee response time is not set becomes a non-guaranteed volume.

The guarantee value setting unit 101 registers, in the QoS setting table 141, the guarantee response time allocated to each of the guaranteed volumes. The guarantee value setting unit 101 mentioned here corresponds to an example of a "storing unit".

The monitoring unit 103 receives, from the operation terminal 3, an instruction to start performance collection from an operator. Then, the monitoring unit 103 starts periodical reception of the performance information on the volumes 232 and the resources from the performance information acquiring unit 251. Then, the monitoring unit 103 writes the received performance information about each of the volumes 232 to the volume performance information file 143. Furthermore, the monitoring unit 103 writes the received performance information about each of the resources to the resource performance information file 144.

The bandwidth management unit 102 specifies guaranteed volumes from the QoS setting table 141.

The bandwidth management unit 102 selects one of the guaranteed volumes. Hereinafter, the selection of the guaranteed volume is referred to as "first selection". Then, the bandwidth management unit 102 acquires, from the volume table 142, information on the resources that are used by the guaranteed volume selected by the first selection. Furthermore, the bandwidth management unit 102 acquires, from the resource performance information file 144, the Busy rate of each of the acquired resources. Then, the bandwidth management unit 102 specifies the resource with the highest Busy rate from among the resources used by the guaranteed volume selected by the first selection.

The bandwidth management unit 102 specifies, by using the volume table 142, the volumes 232 that share the resource that has the highest Busy rate from among the resources and that is used by the guaranteed volume selected by the first selection. The specified volumes 232 are referred to as "shared volumes".

The bandwidth management unit 102 selects a guaranteed volume from among the shared volumes. Hereinafter, the selection of the guaranteed volume is referred to as "second selection". The guaranteed volume selected by the first selection is included in the guaranteed volume selected by the second selection.

Then, the bandwidth management unit 102 acquires, from the volume performance information file 143, the actual measurement response time of the guaranteed volume selected by the second selection. Furthermore, the bandwidth management unit 102 acquires, from the QoS setting table 141, the guarantee response time of the guaranteed volume selected by the second selection.

Furthermore, the bandwidth management unit 102 acquires the interim target response time of the guaranteed volume selected by the second selection. However, if the interim target response time of the guaranteed volume selected by the second selection is not determined, the bandwidth management unit 102 acquires the guarantee response time as the initial value of the interim target response time.

Then, the bandwidth management unit 102 compares the actual measurement response time with the interim target response time of the guaranteed volume selected by the second selection.

If the interim target response time is shorter than the actual measurement response time, the bandwidth management unit 102 reserves an expansion of the bandwidth of the guaranteed volume selected by the second selection. Furthermore, the bandwidth management unit 102 reserves a reduction of the bandwidth of the non-guaranteed volume from among the shared volumes. Then, the bandwidth management unit 102 sets, to the guaranteed volume selected by the second selection as the interim target response time, the result obtained by subtracting a difference between the guarantee response time and the actual measurement response time from the guarantee response time.

In contrast, if the interim target response time is longer than the actual measurement response time, the bandwidth management unit 102 reserves a reduction of the bandwidth of the guaranteed volume selected by the second selection. Furthermore, the bandwidth management unit 102 reserves an expansion of the bandwidth of the non-guaranteed volume from among the shared volumes. Then, the bandwidth management unit 102 sets, to the guaranteed volume selected by the second selection as the interim target response time, the result obtained by adding a difference between the guarantee response time and the actual measurement response time to the guarantee response time.

The bandwidth management unit 102 performs, for all of the guaranteed volumes included in the shared volumes, the second selection of the guaranteed volume from among the shared volumes, a reservation of the adjustment of the bandwidth thereafter, and the setting of the interim target response time.

Furthermore, the bandwidth management unit 102 performs, for all of the guaranteed volumes, the first selection, specifying of shared volumes thereafter, the second selection, a reservation of the adjustment of the bandwidth, and the setting of the interim target response time.

Then, the bandwidth management unit 102 decides the adjustment of the bandwidth of each of the volumes 232 on the basis of the reservation of the adjustment performed on each of the volumes 232. For example, the bandwidth management unit 102 uses the initial value as 0 and calculates the sum of the adjustment of each of the volumes 232 by adding 1 if the reservation indicates an expansion and by subtracting 1 if the reservation indicates a reduction. Then, if the result of the sum is a positive value, the bandwidth management unit 102 decides to expand the bandwidth of the subject volume 232. In contrast, if the result of the sum is a negative value, the bandwidth management unit 102 decides to reduce the bandwidth of the subject volume 232.

Then, the bandwidth management unit 102 notifies the bandwidth control unit 252 of the decided adjustment of the bandwidth of each of the volumes 232. Specifically, the bandwidth management unit 102 sends, to the storage device 2, a setting command for increasing or reducing the bandwidth of each of the volumes 232.

The functions performed by the guarantee value setting unit 101, the bandwidth management unit 102, and the monitoring unit 103 are implemented by, for example, the CPU 13 and the memory 12 illustrated in FIG. 2. For example, the HDD 14 stores therein various kinds of programs that are used to implement the functions performed by the guarantee value setting unit 101, the bandwidth management unit 102, and the monitoring unit 103. Then, the CPU 13 reads the various kinds of programs from the HDD 14; loads the processes that implement the functions performed by the guarantee value setting unit 101, the bandwidth management unit 102, and the monitoring unit 103 in the memory 12; and executes the processes.

The process execution unit 253 receives, from an application executed by the business server 4, a request for reading and writing data from and to the volumes 232. Then, the process execution unit 253 reads and writes the data from and to the volumes 232 in accordance with the request.

The performance information acquiring unit 251 receives, from the monitoring unit 103, an instruction to start the performance collection. Then, the performance information acquiring unit 251 periodically acquires the performance information on each of the volumes 232 and sends the acquired performance information to the monitoring unit 103. Furthermore, the performance information acquiring unit 251 periodically acquires the performance information on each of the resources and sends the acquired performance information to the monitoring unit 103. Here, FIG. 3 illustrates a case in which, as an example of acquiring the performance information on each of the resources, the performance information acquiring unit 251 acquires the performance information from the RAID group 231 and the FC switch 51.

The bandwidth control unit 252 receives, from the bandwidth management unit 102, a setting command for expanding or reducing the bandwidth. Then, the bandwidth control unit 252 expands or reduces the bandwidth of the volume 232 specified by each of the setting commands in accordance with the specified setting command.

Figure 7:
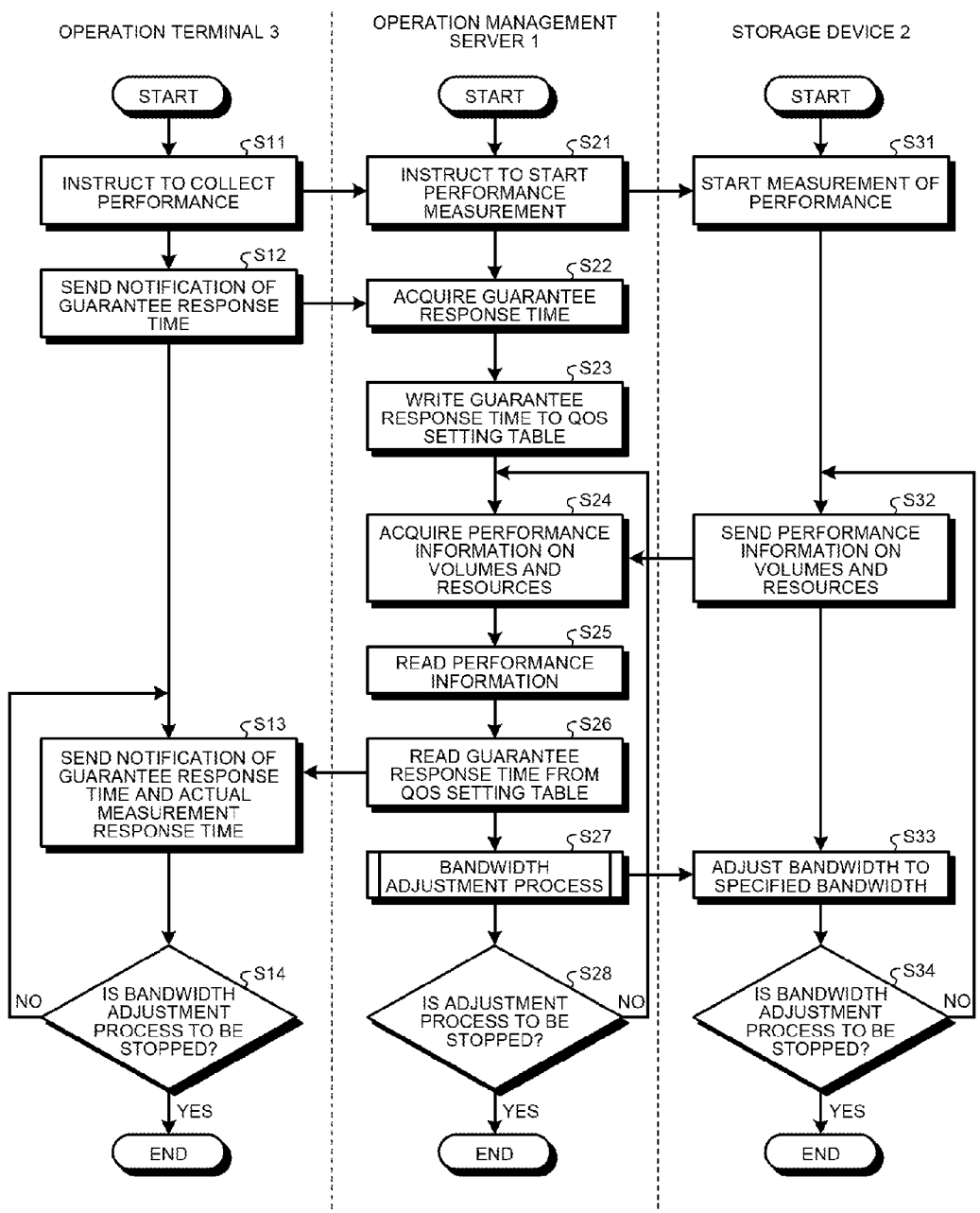
FIG. 7 is a flowchart illustrating the flow of bandwidth control of the storage system according to the first embodiment.

In the following, the flow of the bandwidth control performed in the storage system according to the first embodiment will be described with reference to FIG. 7. FIG. 7 is a flowchart illustrating the flow of bandwidth control of the storage system according to the first embodiment. The flow on the left side illustrated in FIG. 7 indicates the process performed by the operation terminal 3. The flow illustrated in the middle indicates the process performed by the operation management server 1. The flow on the right side indicates the process performed by the storage device 2. The arrow that connects each flow indicates that an instruction or data is sent in the direction of the arrow.

In response to an instruction from an operator, the operation terminal 3 instructs the monitoring unit 103 in the operation management server 1 to collect the performance (Step S11).

Furthermore, in response to the operator, the operation terminal 3 notifies the guarantee value setting unit 101 in the operation management server 1 of the guarantee response time (Step S12).

Then, the operation terminal 3 receives the actual measurement response time from the bandwidth management unit 102 in the operation management server 1. Then, the operation terminal 3 notifies the operator of the guarantee response time and the actual measurement response time by, for example, displaying the time on the monitor (Step S13). The operator checks a difference between the guarantee response time and the actual measurement response time.

Thereafter, the operation terminal 3 determines whether the bandwidth adjustment process is to be stopped (Step S14). For example, if the operation terminal 3 receives an input of instruction to stop the bandwidth adjustment process from the operator, the operation terminal 3 determines to stop the bandwidth adjustment process.

If the operation terminal 3 determines that the bandwidth adjustment process is not to be stopped (No at Step S14), the operation terminal 3 returns to Step S13. In contrast, if the operation terminal 3 determines that the bandwidth adjustment process is to be stopped (Yes at Step S14), the operation terminal 3 ends the adjustment of the bandwidth.

In the following, the process performed by the operation management server 1 will be described. The monitoring unit 103 receives, from the operation terminal 3, an instruction to start the performance measurement. Then, the monitoring unit 103 instructs the performance information acquiring unit 251 in the storage device 2 to start the performance measurement (Step S21).

The guarantee value setting unit 101 acquires the guarantee response time from the operation terminal 3 (Step S22).

Then, the guarantee value setting unit 101 writes the acquired guarantee response time of each of the guaranteed volumes to the QoS setting table 141 (Step S23).

The monitoring unit 103 acquires the performance information on volume 232 and the resource (Step S24). Then, the monitoring unit 103 registers the performance information on the volume 232 in the volume performance information file 143 and registers the performance information on the resource in the resource performance information file 144.

The bandwidth management unit 102 reads the performance information on the volume 232 and the resource from the volume performance information file 143 and the resource performance information file 144, respectively (Step S25).

The bandwidth management unit 102 reads the guarantee response time from the QoS setting table 141 (Step S26). Furthermore, the bandwidth management unit 102 acquires the actual measurement response time from the volume performance information file 143. Then, the bandwidth management unit 102 sends the guarantee response time and the actual measurement response time to the operation terminal 3.

Furthermore, the bandwidth management unit 102 performs the bandwidth adjustment process (Step S27). Then, the bandwidth adjustment process will be described in detail below.

The bandwidth management unit 102 determines whether the bandwidth adjustment process is to be stopped (Step S28). For example, if the bandwidth management unit 102 receives, from an operator via the operation terminal 3, an instruction to stop the bandwidth adjustment process, the bandwidth management unit 102 determines that the bandwidth adjustment process is to be stopped.

If the bandwidth management unit 102 determines that the bandwidth adjustment process is not to be stopped (No at Step S28), the bandwidth management unit 102 returns to Step S24. In contrast, the bandwidth management unit 102 determines that the bandwidth adjustment process is to be stopped (Yes at Step S28), the bandwidth management unit 102 ends the adjustment of the bandwidth.

In the following, the process performed by the storage device 2 will be described. The performance information acquiring unit 251 receives an instruction to start the performance measurement from the monitoring unit 103 in the operation management server 1. Then, the performance information acquiring unit 251 starts the measurement of the performance on each of the volumes 232 and the performance on each of the resources (Step S31).

Then, the performance information acquiring unit 251 sends the acquired performance information on each of the volumes 232 and the acquired performance information on each of the resources to the bandwidth management unit 102 in the operation management server 1 (Step S32).

Thereafter, when the bandwidth control unit 252 receives a setting command from the bandwidth management unit 102 in the operation management server 1, the bandwidth control unit 252 expands or reduces the bandwidth of the specified volume 232 and adjusts the bandwidth to the specified bandwidth (Step S33).

The bandwidth control unit 252 determines whether the bandwidth adjustment process is to be stopped (Step S34). For example, if the bandwidth control unit 252 receives, from the operation management server 1, an instruction from an operator to stop the bandwidth adjustment process, the bandwidth control unit 252 determines that the bandwidth adjustment process is to be stopped.

If the bandwidth control unit 252 determines that the bandwidth adjustment process is not to be stopped (No at Step S34), the bandwidth control unit 252 returns to Step S32. In contrast, if the bandwidth control unit 252 determines that the bandwidth adjustment process is to be stopped (Yes at Step S34), the bandwidth control unit 252 ends the adjustment of the bandwidth.

Figure 8:
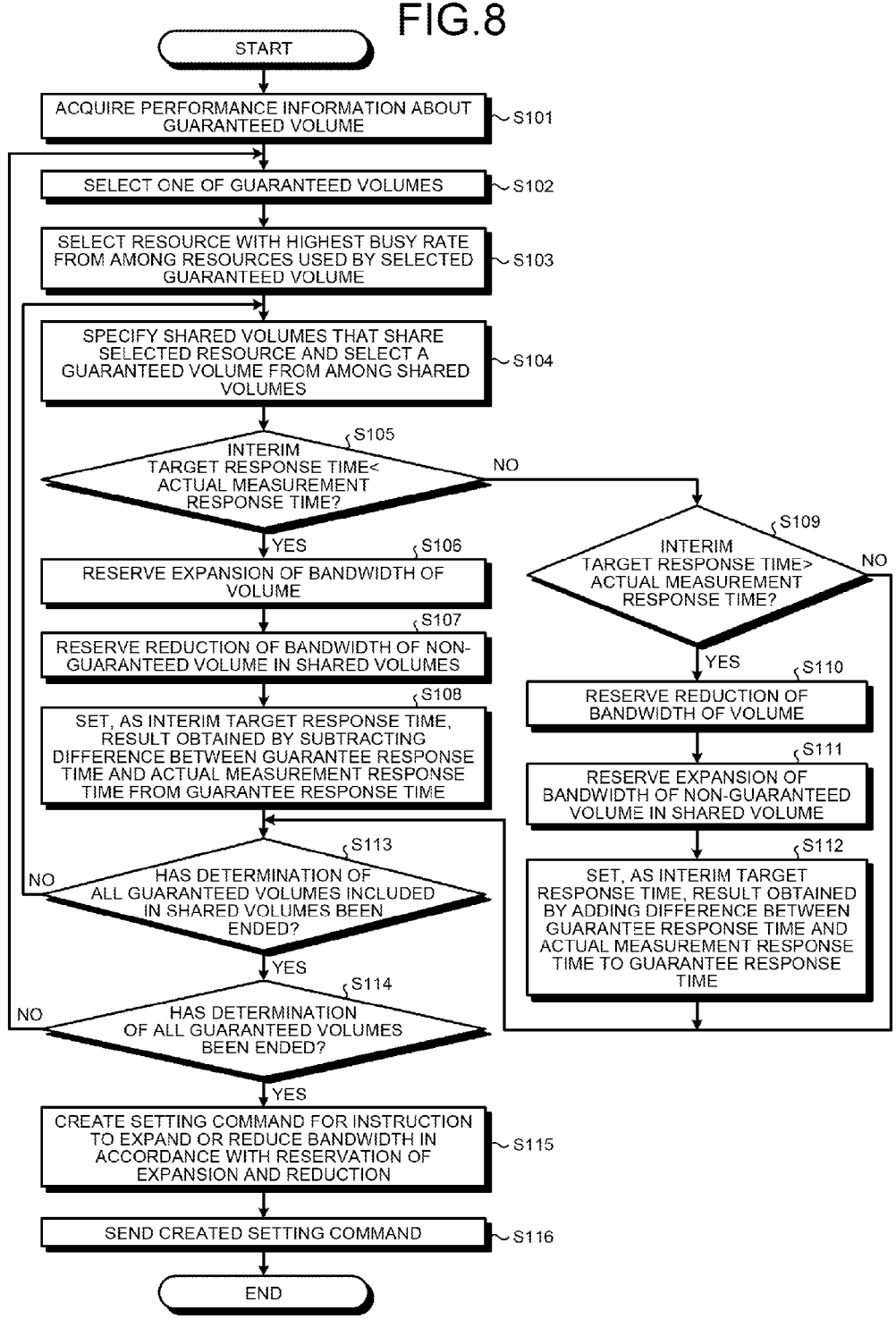
FIG. 8 is a flowchart illustrating the flow of an adjustment process of the bandwidth of a volume performed by an operation management server according to the first embodiment.

In the following, an adjustment process of the bandwidth of the volume 232 performed by the operation management server 1 according to the first embodiment will be described with reference to FIG. 8. FIG. 8 is a flowchart illustrating the flow of the adjustment process of the bandwidth of a volume performed by the operation management server according to the first embodiment. The flowchart illustrated in FIG. 8 indicates, in detail, the process performed by the operation management server 1 at Step S27 illustrated in FIG. 7.

The bandwidth management unit 102 acquires the performance information about guaranteed volumes from the volume performance information file 143 (Step S101).

The bandwidth management unit 102 selects one of the guaranteed volumes (the first selection) (Step S102).

The bandwidth management unit 102 selects the resource with the highest Busy rate from among the resources used by the selected guaranteed volume (Step S103).

Then, the bandwidth management unit 102 specifies the shared volumes that share the selected resource. Furthermore, the bandwidth management unit 102 selects a guaranteed volume from among the shared volumes (the second selection) (Step S104).

The bandwidth management unit 102 determines whether the interim target response time that is set in the selected guaranteed volume is shorter than the actual measurement response time (Step S105). If the interim target response time is shorter than the actual measurement response time (Yes at Step S105), the bandwidth management unit 102 reserves an expansion of the bandwidth of the guaranteed volume selected by the second selection (Step S106).

Furthermore, the bandwidth management unit 102 reserves a reduction of the bandwidth of the non-guaranteed volume in the shared volumes (Step S107).

Then, the bandwidth management unit 102 sets, as the interim target response time of the guaranteed volume selected by the second selection, the result obtained by subtracting a difference between the guarantee response time and the actual measurement response time of the guaranteed volume selected by the second selection from the guarantee response time (Step S108).

In contrast, if the interim target response time is greater than the actual measurement response time (No at Step S105), the bandwidth management unit 102 determines whether the interim target response time is longer than the actual measurement response time (Step S109). If the interim target response time is equal to the actual measurement response time (No at Step S109), the bandwidth management unit 102 proceeds to Step S113.

In contrast, if the interim target response time is longer than the actual measurement response time (Yes at Step S109), the bandwidth management unit 102 reserves a reduction of the bandwidth of the guaranteed volume selected by the second selection (Step S110).

Furthermore, the bandwidth management unit 102 reserves an expansion of the bandwidth of the non-guaranteed volume in the shared volumes (Step S111).

Then, the bandwidth management unit 102 sets, as the interim target response time in the guaranteed volume selected by the second selection, the result obtained by adding the difference between the guarantee response time and the actual measurement response time of the guaranteed volume selected by the second selection to the guarantee response time (Step S112).

The bandwidth management unit 102 determines whether the determination of all the guaranteed volumes included in the shared volumes has been ended (Step S113). Namely, the bandwidth management unit 102 determines whether the second selection has been completed to all the guaranteed volumes included in the shared volumes. If a guaranteed volume that has not been subjected to the determination is present (No at Step S113), the bandwidth management unit 102 returns to Step S104.

In contrast, if the determination has been ended for all the guaranteed volumes included in the shared volumes (Yes at Step S113), the bandwidth management unit 102 determines whether the determination of all the guaranteed volumes has been ended (Step S114). Namely, the bandwidth management unit 102 determines whether the determination of the bandwidth adjustment has been completed for all the guaranteed volumes selected by the first selection. If a guaranteed volume that has not been subjected to the determination is present (No at Step S114), the bandwidth management unit 102 returns to Step S102.

In contrast, if the determination of all the guaranteed volumes has been ended (Yes at Step S114), the bandwidth management unit 102 decides an expansion or a reduction of the bandwidth of each of the volumes 232 from the reservation of the expansion and the reduction with respect to each of the volumes 232. Then, the bandwidth management unit 102 creates a setting command for an instruction to expand or reduce the bandwidth of each of the decided volumes 232 (Step S115).

Then, the bandwidth management unit 102 sends the created setting command to the bandwidth control unit 252 (Step S116).

As described above, the storage management device according to the first embodiment sets the guarantee performance, sequentially calculates the interim target response time that is used to cancel out the difference with the guarantee performance, and adjusts the bandwidth so as to approach the interim target response time. Consequently, the storage management device according to the first embodiment can make the average of the bandwidth of the guaranteed volumes approach the guarantee value. Accordingly, even if a momentary actual measurement value is different from the guarantee response time, the range of adjustment can be gradually reduced and thus the system can be stably operated while the bandwidth is adjusted.

Furthermore, in the first embodiment, the bandwidth management unit 102 calculates the interim target response time on the basis of a deviation of the actual measurement value from the guarantee value; however, the calculation method is not limited thereto. For example, after the adjustment time of the bandwidth is determined, the interim target response time may also be calculated on the basis of the average value obtained by dividing the deviation by the remaining time.

(Modification)

Furthermore, in the first embodiment described above, the interim target response time that compensates a difference between the guarantee response time and the actual measurement response time is sequentially obtained and the bandwidth is adjusted so as to match the interim target response time. Namely, the bandwidth is adjusted such that the average of the actual measurement response time satisfies the guarantee response time. In contrast, in a modification, guarantee is performed so as to obtain the rate of the actual measurement response time that exceeds the guarantee response time is equal to or less than a certain level. Namely, the operation management server according to the modification differs from the first embodiment in that a different calculation method of the interim target response time is used. In the modification, a description will be given of a case in which the rate of actual measurement response time that exceeds the guarantee response time is 10%.

The storing unit 104 stores, in the volume performance information file 143, the actual measurement response time of each of the volumes 232 obtained from at least the most recent 10 measurements.

Figures 9, 10:
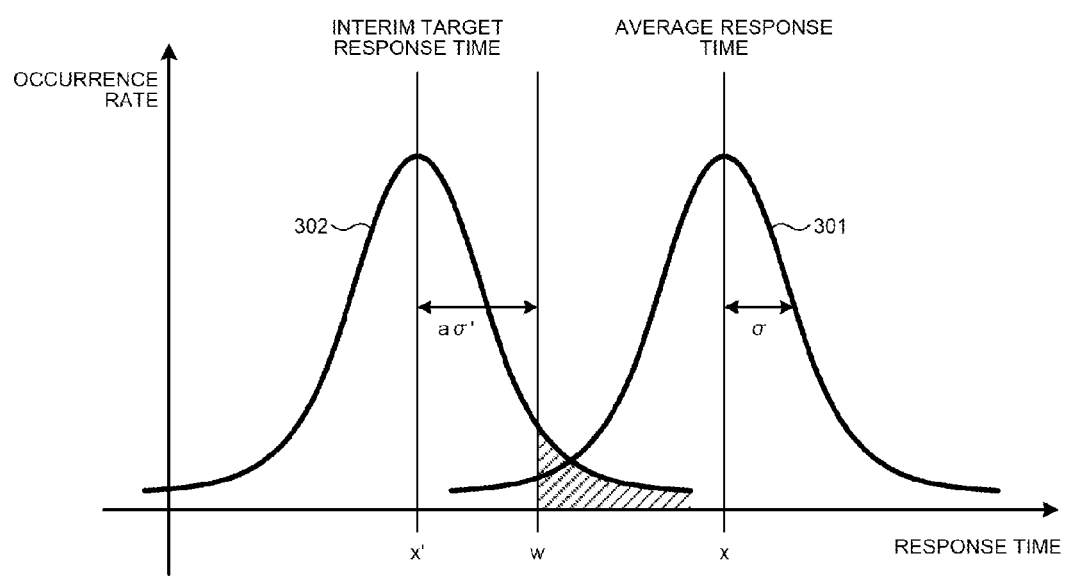
FIG. 9 is a schematic diagram illustrating a calculation method of interim target response time performed by an operation management server according to a modification of the first embodiment.
FIG. 10 is a schematic diagram illustrating an example of the actual measurement response time obtained from the most recent 10 measurements.

The bandwidth management unit 102 acquires, from the volume performance information file 143, the actual measurement response time obtained from the most recent 10 measurements. Then, the bandwidth management unit 102 obtains a normal distribution curve 301 illustrated in FIG. 9 by using the acquired actual measurement response time obtained from the most recent 10 measurements. Here, FIG. 9 is a schematic diagram illustrating a calculation method of interim target response time performed by an operation management server according to a modification of the first embodiment. The symbol of a represents a standard deviation in the normal distribution curve 301. Furthermore, the symbol of x represents the average in the normal distribution curve 301. Namely, x is the average response time.

Furthermore, w illustrated in FIG. 9 is a guarantee value. Furthermore, a normal distribution curve 302 is a normal distribution curve targeted for adjustment. Furthermore, $a\sigma'$ represents a standard deviation of the normal distribution curve 302. The symbol of a is a coefficient. Furthermore, x' represents the average of the normal distribution curve 302. Namely, if the area indicated by the oblique lines illustrated in FIG. 9 becomes 10% of the normal distribution curve 302, the rate of the actual measurement response time that exceeds the guarantee response time becomes 10%.

Furthermore, $x'+a\sigma'=w$ holds, where the interim target response time is x'. Furthermore, it can be assumed that x, x', $\sigma$, and $\sigma'$ have the proportional relation of $x:x'=\sigma:\sigma'$. Here, it is assumed that a change in the bandwidth is performed in stages, it is assumed that only immediately previous performance information is used, and it is assumed that x, x', $\sigma$, and $\sigma'$ are in proportion in order to simplify the calculation. However, the relational expression of x, x', $\sigma$, and $\sigma'$ may also be strictly calculated by using a normal distribution equation.

Then, the interim target response time x' is calculated from $x'=w\times\{x/(a\sigma+x)\}$ on the basis of $x'+a\sigma'=w$ and $x:x'=\sigma:\sigma'$.

Furthermore, $\sigma'$ is calculated from $$\sigma'=(w\sigma/x)\times\{x/(a\sigma+x)\}.$$

Accordingly, the bandwidth management unit 102 obtains the interim target response time x' by using the following method. First, the bandwidth management unit 102 obtains, by using the standard normal distribution table, a coefficient a of the deviation rate of 10% or less. Then, the bandwidth management unit 102 calculates the interim target response time x' by using the obtained coefficient a.

Then, similarly to the first embodiment, by using the calculated interim target response time, the bandwidth management unit 102 determines an expansion and a reduction of the bandwidth of each of the guaranteed volumes and the non-guaranteed volumes.

In the following, a specific calculation example of the interim target response time will be described. Here, a description will be given of a case in which the interim target response time with the guarantee value w of 7 and the deviation rate of 10% is obtained.

The bandwidth management unit 102 acquires each of the values illustrated in FIG. 10 as data on the actual measurement response time obtained from the most recent 10 measurements. FIG. 10 is a schematic diagram illustrating an example of the actual measurement response time obtained from the most recent 10 measurements. Then, the bandwidth management unit 102 calculates the average x obtained this time as 9.2. Furthermore, the bandwidth management unit 102 calculates the standard deviation σ obtained this time as 1.6. Furthermore, by using the standard normal distribution table, the bandwidth management unit 102 determines that the coefficient a of the deviation rate that becomes equal to or less than 10% is 1.3.

Then, the bandwidth management unit 102 substitutes each value into x'=w×{x/(aσ+x)} and calculates the interim target response time x' as 5.7. Furthermore, the bandwidth management unit 102 substitutes each value into σ'=(wσ/x)×{x/(aσ+x)} and calculates the standard deviation a' as 0.99.

Here, it is conceivable that old data contains the load that is different from the load obtained when the bandwidth is adjusted and, furthermore, if the amount of data is small, an accurate normal distribution curve is not obtained. Thus, in the modification, the most recent 10 pieces of data are used by considering the balance between the accuracy of the data and the precision of the normal distribution curve. However, the amount of data to be used is not limited thereto. For example, if a change in the load is small, the precision of the normal distribution curve may further be improved by using the greater amount of data.

As described above, the operation management server according to the modification can suppress the rate of the actual measurement response time that exceeds the guarantee response time to a predetermined rate. Consequently, it is possible to suppress the rate of the actual measurement performance that exceeds the guarantee value and thus can allow the system to stably operate while the bandwidth is adjusted.

Furthermore, the configuration may also be possible such that an operator can select one of the calculation method of the interim target response time described in the first embodiment and the calculation method of the interim target response time described in the modification. For example, this configuration can be implemented by providing the following function.

The operation terminal 3 displays the guarantee type selection screen illustrated in FIG. 11 on the display device. FIG. 11 is a schematic diagram illustrating an example of a guarantee type selection screen. Then, by using an input device, such as a mouse or the like, the operator selects, for each guaranteed volume from the guarantee type selection screen, one of the guarantee types between the guarantee of the average performance and the guarantee of the deviation rate from the target performance. The operation terminal 3 notifies the bandwidth management unit 102 of the information on the input guarantee type.

Then, for the guaranteed volume in which the guarantee type indicating the guarantee of the average performance is selected, the bandwidth management unit 102 adjusts the bandwidth by using the method described in the first embodiment, whereas, for the guaranteed volume in which the guarantee type indicating the guarantee of the deviation rate from the target performance is selected, the bandwidth management unit 102 adjusts the bandwidth by using the method described in the modification in the first embodiment.

In this way, by allowing the method described in the first embodiment or the modification to be selected as a method of adjusting the bandwidth, it is possible to adjust the bandwidth that is suitable for the operation environment.

[b] Second Embodiment

In the following, a second embodiment will be described. The second embodiment differs from the first embodiment in that an operation management server according to the second embodiment includes the volumes 232 in each of which a target value is set in the non-guaranteed volume and allows the performance of the volume 232, in which the target value is set in the non-guaranteed volume, to approach the target value by giving a priority to performance guarantee of the guaranteed volume. The operation management server according to the second embodiment is also represented by the block diagram illustrated in FIG. 3. In a description below, descriptions of components having the same functions as those performed in the first embodiment will be omitted. Furthermore, in a description below, in order to avoid confusion with the non-guaranteed volume described in the first embodiment, the non-guaranteed volume is referred to as a "sacrifice volume". Then, the volume 232 in which the target value is set in a sacrifice volume is referred to as a "target value set volume" and the volume 232 in which the target value is not set is referred to as a "non-target value set volume".

When the operation terminal 3 receives a specification of the volume 232 targeted for adjustment of the bandwidth from an operator, the operation terminal 3 displays the volume type setting screen illustrated in FIG. 12 on a display device, such as a monitor or the like. FIG. 12 is a schematic diagram illustrating an example of a volume type setting screen. Then, the operator selects, by using an input device, such as a mouse or the like, the type of the volume, such as the subject volume 232 being made to be a guaranteed volume or a sacrifice volume. For example, the guaranteed volume is selected, by default, as the type of the volume. Furthermore, the operator inputs the target performance by using an input device, such as a keyboard or the like. More specifically, the operator inputs the guarantee response time to the guaranteed volume and inputs the target value to the sacrifice volume. The operation terminal 3 sends, to the guarantee value setting unit 101, the type of the volume and the target performance that are input by the operator.

The guarantee value setting unit 101 receives the type of the volume and the target performance from the operation terminal 3. Then, the guarantee value setting unit 101 registers the received type of the volume and the target performance in the QoS setting table 141. FIG. 13 is a schematic diagram illustrating an example of a QoS setting table according to a second embodiment. The QoS setting table 141 according to the second embodiment includes an item that represents the type of the volumes. If the volume is a sacrifice volume in which the target value is set, the guarantee value setting unit 101 registers sacrifice in the field of the type in the QoS setting table 141. Then, the guarantee value setting unit 101 registers the target value in the field of the target/guarantee performance. In contrast, if the volume is a guaranteed volume, the guarantee value setting unit 101 registers guarantee in the field of the type in the QoS setting table 141. Then, the guarantee value setting unit 101 registers a guarantee value in the field of the target/guarantee performance.

In the following, the bandwidth management unit 102 will be described; however, here, the operation performed subsequent to the second selection will be described. The bandwidth management unit 102 selects, as the second selection, a guaranteed volume or a target value set volume from the shared volumes. If the volume 232 selected by the second selection is a sacrifice volume, the bandwidth management unit 102 sets, for the subject volume 232, the sacrifice flag to OFF. The sacrifice flag mentioned here is a flag indicating that, in a case of ON, even if a target value is set, a priority is given to a reduction of the bandwidth of the volume 232.

Then, the bandwidth management unit 102 acquires, from the volume performance information file 143, the actual measurement response time of the volume 232 that is selected by the second selection.

Then, if the volume 232 selected by the second selection is a guaranteed volume, the bandwidth management unit 102 acquires, from the QoS setting table 141, the guarantee response time of the guaranteed volume selected by the second selection. Then, the bandwidth management unit 102 acquires interim target response time of the guaranteed volume selected by the second selection.

Then, the bandwidth management unit 102 compares the actual measurement response time with the interim target response time of the guaranteed volume selected by the second selection.

If the interim target response time is shorter than the actual measurement response time, the bandwidth management unit 102 reserves an expansion of the bandwidth of the guaranteed volume selected by the second selection. Furthermore, the bandwidth management unit 102 reserves a reduction of the bandwidth of the non-target value set volume in the shared volume. Then, the bandwidth management unit 102 sets the sacrifice flag of the target value set volume in the shared volume to ON. Then, the bandwidth management unit 102 reserves a reduction of the bandwidth of the target value set volume in the shared volume. Then, the bandwidth management unit 102 sets, as the interim target response time in the guaranteed volume selected by the second selection, the result obtained by subtracting the difference between the guarantee response time and the actual measurement response time from the guarantee response time.

In contrast, if the interim target response time is longer than the actual measurement response time, the bandwidth management unit 102 reserves a reduction of the bandwidth of the guaranteed volume selected by the second selection. Furthermore, the bandwidth management unit 102 reserves an expansion of the bandwidth of the non-target value set volume in the shared volume. Then, the bandwidth management unit 102 sets, as the interim target response time in the guaranteed volume selected by the second selection, the result obtained by adding the difference between the guarantee response time and the actual measurement response time to the guarantee response time.

In contrast, if the volume 232 selected by the second selection is a target value set volume, the bandwidth management unit 102 acquires, from the QoS setting table 141, the target response time of the target value set volume selected by the second selection. Then, the bandwidth management unit 102 compares the actual measurement response time with the target response time of the target value set volume selected by the second selection.

If the target response time is shorter than the actual measurement response time, the bandwidth management unit 102 checks the sacrifice flag of the target value set volume selected by the second selection. If the sacrifice flag is set to ON, the bandwidth management unit 102 does not expand the bandwidth of the target value set volume selected by the second selection. In contrast, if the sacrifice flag is set to OFF, the bandwidth management unit 102 reserves an expansion of the bandwidth of the target value set volume selected by the second selection. Furthermore, the bandwidth management unit 102 reserves a reduction of the bandwidth of the non-target value set volume in the shared volume.

Between the expansion of the bandwidth of the guaranteed volume and the expansion of the bandwidth of the target value set volume, a priority is given to the expansion of the guaranteed volume. Namely, after the bandwidth of the guaranteed volume is reserved, if allocation of the bandwidth to the non-target value set volume still remains, the bandwidth management unit 102 reserves an expansion of the bandwidth of the target value set volume. If allocation of the bandwidth to the non-target value set volume does not remain, the bandwidth management unit 102 does not expand the bandwidth of the target value set volume.

In contrast, if the target response time is longer than the actual measurement response time, the bandwidth management unit 102 reserves a reduction of the bandwidth of the target value set volume selected by the second selection. Furthermore, the bandwidth management unit 102 checks the sacrifice flag of the target value set volume selected by the second selection. If the sacrifice flag is set to OFF, the bandwidth management unit 102 reserves an expansion of the bandwidth of the non-target value set volume in the shared volume. The target value set volume mentioned here corresponds to an example of "another storage area".

The bandwidth management unit 102 performs the second selection of a guaranteed volume and a target value set volume from the shared volumes, a reservation of adjustment of the bandwidth thereafter, and the setting of the interim target response time on all of the guaranteed volumes and the target value set volumes included in the shared volumes.

Figure 14:
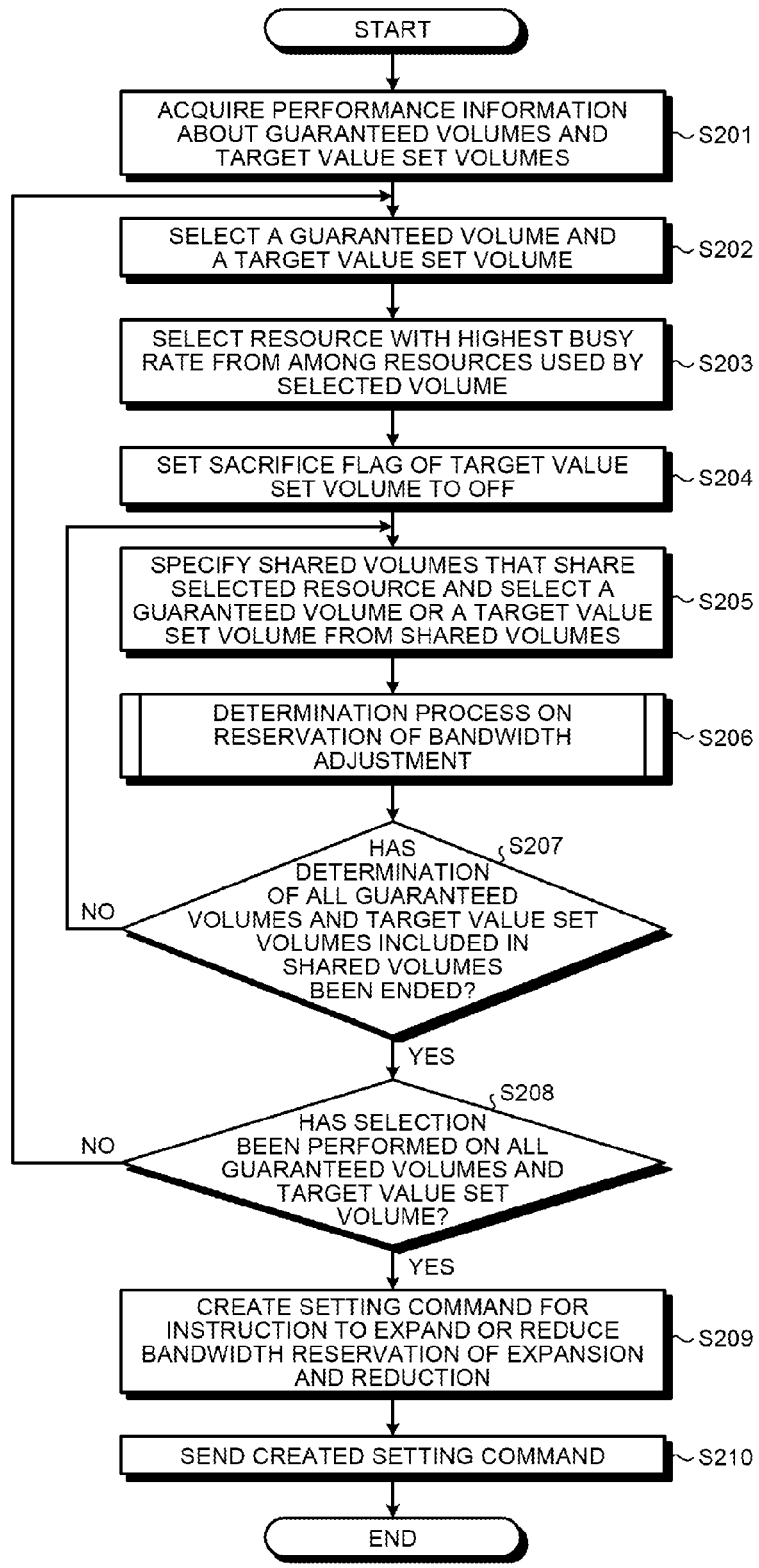
FIG. 14 is a flowchart illustrating the flow of an adjustment process of the bandwidth of volumes performed by an operation management server according to the second embodiment.

In the following, an adjustment process of the bandwidth of the volumes 232 performed by the operation management server 1 according to the second embodiment will be described with reference to FIG. 14. FIG. 14 is a flowchart illustrating the flow of an adjustment process of the bandwidth of the volumes performed by an operation management server according to the second embodiment.

The bandwidth management unit 102 acquires, from the volume performance information file 143, the performance information about guaranteed volumes and target value set volumes (Step S201).

The bandwidth management unit 102 selects a guaranteed volume and a target value set volume (the first selection) (Step S202).

The bandwidth management unit 102 selects the resource with the highest Busy rate from among the resources used by the selected volume 232 (Step S203).

Furthermore, the bandwidth management unit 102 sets the sacrifice flag of the target value set volume to OFF (Step S204).

Then, the bandwidth management unit 102 specifies the shared volumes that share the selected resource. Furthermore, the bandwidth management unit 102 selects a guaranteed volume or a target value set volume from the shared volumes (the second selection) (Step S205).

Then, the bandwidth management unit 102 performs a determination process on a reservation of the bandwidth adjustment of the volume 232 selected by the second selection (Step S206). The determination process of the reservation of the bandwidth adjustment will be described in detail below.

The bandwidth management unit 102 determines whether the determination of all of the guaranteed volumes and the target value set volumes included in the shared volumes has been ended (Step S207). If a guaranteed volume or a target value set volume that has not been subjected to the determination is present (No at Step S207), the bandwidth management unit 102 proceeds to Step S205.

In contrast, if the determination of all of the guaranteed volumes and the target value set volumes included in the shared volumes has been ended (Yes at Step S207), the bandwidth management unit 102 determines whether the selection (the first selection) has been performed on all of the guaranteed volumes and the target value set volumes has been ended (Step S208). If a guaranteed volume or a target value set volume that has not been subjected to the first selection is present (No at Step S208), the bandwidth management unit 102 returns to Step S202.

In contrast, if selection has been performed on all of the guaranteed volumes and the target value set volumes has been ended (Yes at Step S208), the bandwidth management unit 102 decides, from the reservation of the expansion and the reduction performed on each of the volumes 232, the expansion of the reduction of the bandwidth of each of the volumes 232. Then, the bandwidth management unit 102 creates a setting command that indicates the decided expansion or reduction of the bandwidth of each of the volumes 232 (Step S209).

Then, the bandwidth management unit 102 sends the created setting command to the bandwidth control unit 252 (Step S210).

Figure 15:
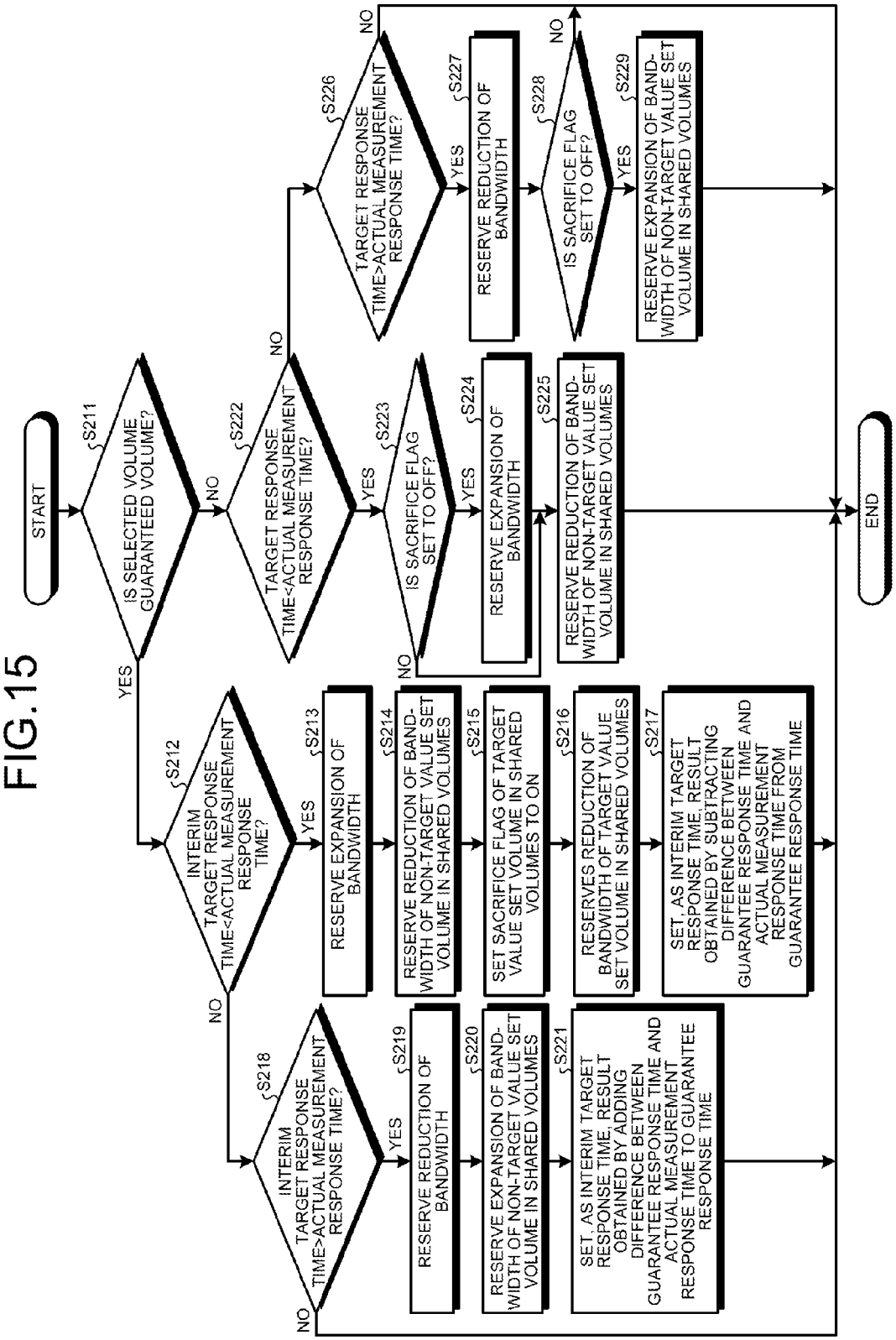
FIG. 15 is a flowchart illustrating the flow of a determination process of reservation of the bandwidth adjustment according to the second embodiment.

In the following, the flow of the determination process of a reservation of the bandwidth adjustment according to the second embodiment will be described with reference to FIG. 15. FIG. 15 is a flowchart illustrating the flow of a determination process of reservation of the bandwidth adjustment according to the second embodiment. The flow illustrated in FIG. 15 corresponds to an example of the process performed at Step S206 indicated in the flowchart illustrated in FIG. 14.

The bandwidth management unit 102 determines whether the selected volume 232 is a guaranteed volume (Step S211).

If the selected volume 232 is a guaranteed volume (Yes at Step S211), the bandwidth management unit 102 determines whether the interim target response time that is set in the selected guaranteed volume is shorter than the actual measurement response time (Step S212). If the interim target response time is shorter than the actual measurement response time (Yes at Step S212), the bandwidth management unit 102 reserves an expansion of the bandwidth of the guaranteed volume selected by the second selection (Step S213).

Furthermore, the bandwidth management unit 102 reserves a reduction of the bandwidth of the non-target value set volume in the shared volumes (Step S214).

Then, the bandwidth management unit 102 sets the sacrifice flag of the target value set volume in the shared volumes to ON (Step S215). Then, the bandwidth management unit 102 reserves a reduction of the bandwidth of the target value set volume in the shared volumes (Step S216).

Then, the bandwidth management unit 102 sets, as the interim target response time in the guaranteed volume selected by the second selection, the result obtained by subtracting the difference between the guarantee response time and the actual measurement response time of the guaranteed volume selected by the second selection from the guarantee response time (Step S217).

In contrast, if the interim target response time is equal to or greater than the actual measurement response time (No at Step S212), the bandwidth management unit 102 determines whether the interim target response time is longer than the actual measurement response time (Step S218). If the interim target response time is equal to the actual measurement response time (No at Step S218), the bandwidth management unit 102 ends the determination process of a reservation of the bandwidth adjustment.

In contrast, if the interim target response time is longer than the actual measurement response time (Yes at Step S218), the bandwidth management unit 102 reserves a reduction of the bandwidth of the guaranteed volume selected by the second selection (Step S219).

Furthermore, the bandwidth management unit 102 reserves an expansion of the bandwidth of the non-target value set volume in the shared volumes (Step S220).

Then, the bandwidth management unit 102 sets, as interim target response time in the guaranteed volume selected by the second selection, the result obtained by adding the difference between the guarantee response time and the actual measurement response time of the guaranteed volume selected by the second selection to the guarantee response time (Step S221).

In contrast, if the selected volume 232 is the target value set volume (No at Step S211), the bandwidth management unit 102 determines whether the target response time that is set in the selected target value set volume is shorter than the actual measurement response time (Step S222).

If the target response time is shorter than the actual measurement response time (Yes at Step S222), the bandwidth management unit 102 determines whether the sacrifice flag of the target value set volume selected by the second selection is set to OFF (Step S223). If the sacrifice flag is set to OFF (Yes at Step S223), the bandwidth management unit 102 reserves an expansion of the bandwidth of the target value set volume selected by the second selection (Step S224). In contrast, if the sacrifice flag is set to ON (No at Step S223), the bandwidth management unit 102 proceeds to Step S225.

Then, the bandwidth management unit 102 reserves a reduction of the bandwidth of the non-target value set volume in the shared volumes (Step S225).

In contrast, if the target response time is equal to or greater than the actual measurement response time (No at Step S222), the bandwidth management unit 102 determines whether the target response time is longer than the actual measurement response time (Step S226). If the target response time is equal to the actual measurement response time (No at Step S226), the bandwidth management unit 102 ends the determination process of the reservation of the bandwidth adjustment.

In contrast, if the target response time is longer than the actual measurement response time (Yes at Step S226), the bandwidth management unit 102 reserves a reduction of the bandwidth of the target value set volume selected by the second selection (Step S227).

Furthermore, the bandwidth management unit 102 determines whether the sacrifice flag of the target value set volume is set to OFF (Step S228). If the sacrifice flag is set to ON (No at Step S228), the bandwidth management unit 102 ends the determination process of the reservation of the bandwidth adjustment.

In contrast, if the sacrifice flag is set to OFF (Yes at Step S228), the bandwidth management unit 102 reserves an expansion of the bandwidth of the non-target value set volume in the shared volumes (Step S229).

As described above, in the storage management device according to the second embodiment, a target value set volume in which a target value is set in a non-guaranteed volume is provided. Then, the storage management device according to the second embodiment secures, with priority, the bandwidth of a guaranteed volume and expands, if the bandwidth of the guaranteed volume is secured, the bandwidth of the target value set volume. Consequently, it is possible to achieve at least the performance that is guaranteed in a guaranteed volume and, furthermore, if a surplus of the performance is present, it is possible to secure the performance of the target value set volume. Accordingly, the performance guarantee of the guaranteed volume can further reliably be implemented.

[c] Third Embodiment

In the following, a third embodiment will be described. The third embodiment differs from the first embodiment in that an operation management server according to the third embodiment guarantees the IOPS or the throughput of each of the volumes. The operation management server according to the third embodiment can also be represented by the block diagram illustrated in FIG. 3. In a description below, descriptions of components having the same functions as those performed in the first embodiment will be omitted.

In the third embodiment, in a case of a guaranteed volume in which the IOPS or the throughput is guaranteed, a disk Busy rate is adjusted by reducing the bandwidth of the other volumes 232 such that the guaranteed volume becomes the maximum band use state. The Busy rate of a disk mentioned here is obtained by dividing, for example, the total read/write time in a predetermined time period with respect to the disk 203 that constitutes a guaranteed volume by the predetermined time period. The Busy rate obtained in the maximum band use state is a value that has no effect on the performance due to the other volumes 232 if the value falls below the Busy rate and is a value that exhibits the maximum performance in a guaranteed volume. For example, the actual measurement is performed on the relationship between the Busy rate and the performance and, on the basis of the obtained results, the Busy rate obtained just before the performance becomes saturated is set to the Busy rate that causes the maximum use state. In practice, the Busy rate is preferably set in accordance with the operation environment. In a description below, if the IOPS is guaranteed, the Busy rate that causes the maximum use state is set to 60% and, if the throughput is guaranteed, the Busy rate that causes the maximum use state is set to 80%. In a description below, the Busy rate of a disk is simply referred to as a "Busy rate".

An operator specifies, by using the operation terminal 3, a guaranteed volume in which the performance is guaranteed. Furthermore, the operator inputs, for each guaranteed volume, information on the type of the performance guarantee indicating which one of the IOPS, the throughput, and the response time is guaranteed and inputs the subject guarantee value. The operation terminal 3 sends, to the guarantee value setting unit 101, the information on the guaranteed volumes, the information on the type of the performance guarantee of each of the guaranteed volumes, and the guarantee values.

The guarantee value setting unit 101 receives, from the operation terminal 3, the information on the guaranteed volumes, the information on the type of the performance guarantee of each of the guaranteed volumes, and the guarantee values. Then, the guarantee value setting unit 101 registers, in the QoS setting table 141, the received information on the guaranteed volumes, the information on the type of the performance guarantee of each of the guaranteed volumes, and the guarantee values. For example, the guarantee value setting unit 101 registers, in the field of the type in the QoS setting table 141 illustrated in FIG. 4, the information on the type of the performance guarantee together with the type of the volumes 232.

The bandwidth management unit 102 acquires, from the QoS setting table 141, the type of the performance guarantee of each of the guaranteed volumes and the guarantee IOPS, guarantee throughput, or the guarantee response time that is set in each of the guaranteed volumes. Furthermore, the bandwidth management unit 102 acquires, from the volume performance information file 143, actual measurement response time, the actual measurement IOPS, and the actual measurement throughput of each of the guaranteed volumes.

Then, the bandwidth management unit 102 performs the first selection and the second selection. If the type of the performance guarantee of the guaranteed volume selected by the second selection is the response time, similarly to the first embodiment, the bandwidth management unit 102 reserves, by using the interim target response time, an expansion or a reduction of the bandwidth of the guaranteed volume and, furthermore, resets the interim target response time.

In contrast, if the type of the performance guarantee of the guaranteed volume selected by the second selection is the IOPS, the bandwidth management unit 102 compares the guarantee IOPS with the actual measurement IOPS. If the guarantee IOPS is equal to or less than the actual measurement IOPS, the bandwidth management unit 102 determines that the performance is guaranteed and the bandwidth management unit 102 does not perform the band adjustment of the guaranteed volume selected by the second selection.

In contrast, if the guarantee IOPS is greater than the actual measurement IOPS, the bandwidth management unit 102 determines whether the Busy rate of the guaranteed volume selected by the second selection is equal to or greater than 60%. Then, if the Busy rate is equal to or greater than 60%, the bandwidth management unit 102 reserves a reduction of the bandwidth of the non-guaranteed volume. However, if no non-guaranteed volume in which the bandwidth can be reduced is present, the bandwidth management unit 102 sends a warning message to the operation terminal 3.

In contrast, if the Busy rate is less than 60%, the bandwidth management unit 102 determines that it is difficult to perform the performance guarantee and sends the warning message to the operation terminal 3.

Furthermore, if the type of the performance guarantee of the guaranteed volume selected by the second selection is the throughput, the bandwidth management unit 102 compares the guarantee throughput with the actual measurement throughput. If the guarantee throughput is equal to or less than the actual measurement throughput, the bandwidth management unit 102 determines that the performance is guaranteed and does not perform the band adjustment of the guaranteed volume selected by the second selection.

In contrast, if the guarantee throughput is greater than the actual measurement throughput, the bandwidth management unit 102 determines whether the Busy rate of the guaranteed volume selected by the second selection is equal to or greater than 80%. If the Busy rate is equal to or greater than 80%, the bandwidth management unit 102 reserves a reduction of the bandwidth of the non-guaranteed volume. However, if no non-guaranteed volume in which the bandwidth can be reduced is present, the bandwidth management unit 102 sends a warning message to the operation terminal 3.

In contrast, if the Busy rate is less than 80%, the bandwidth management unit 102 determines that the performance guarantee is difficult and sends the warning message to the operation terminal 3.

In this way, even if a volume is the guaranteed volume with the highest Busy rate, the bandwidth management unit 102 performs control such that, when the IOPS is used as the criterion, the Busy rate of the guaranteed volume is set to equal to or less than 60% and, when the throughput is used as the criterion, the Busy rate of the guaranteed volume is set to equal to or less than 80%. Namely, the value of the threshold varies depending on the criterion; however, the bandwidth management unit 102 adjusts the Busy rate such that the Busy rate of the guaranteed volume with the highest Busy rate is equal to or less than the threshold.

Figure 16:
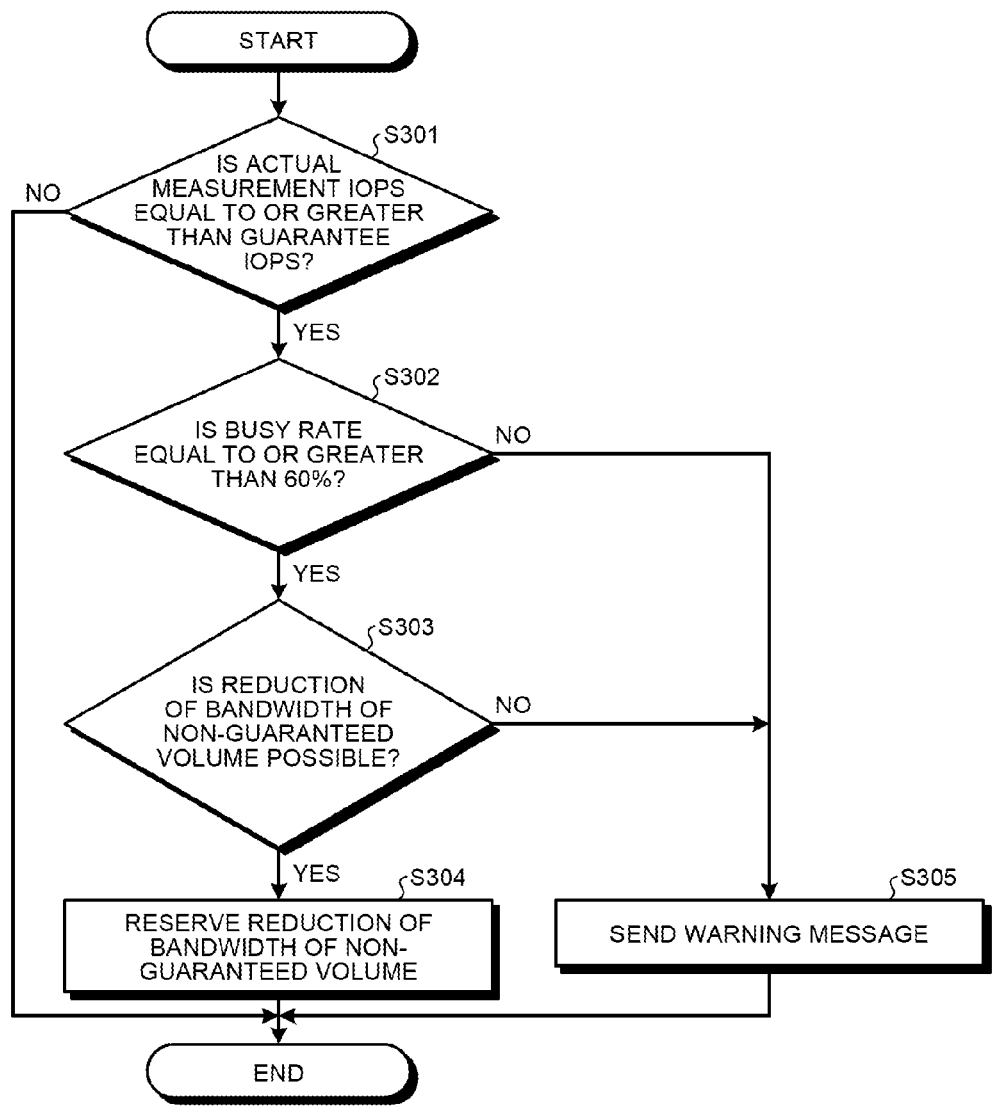
FIG. 16 is a flowchart a determination process of bandwidth adjustment when the IOPS is guaranteed.

In the following, the flow of the determination process of reserving the bandwidth adjustment performed when the IOPS is guaranteed will be described with reference to FIG. 16. FIG. 16 is a flowchart a determination process of bandwidth adjustment when the IOPS is guaranteed.

The bandwidth management unit 102 determines whether the actual measurement IOPS is equal to or greater than the guarantee IOPS (Step S301). If the actual measurement IOPS is less than the guarantee IOPS (No at Step S301), the bandwidth management unit 102 ends the determination process of reserving the bandwidth adjustment.

In contrast, if the actual measurement IOPS is equal to or greater than the guarantee IOPS (Yes at Step S301), the bandwidth management unit 102 determines whether the Busy rate is equal to or greater than 60% (Step S302).

If the Busy rate is equal to or greater than 60% (Yes at Step S302), the bandwidth management unit 102 determines whether a reduction of the bandwidth of the non-guaranteed volume in the shared volumes is possible (Step S303).

If the reduction of the bandwidth is possible (Yes at Step S303), the bandwidth management unit 102 reserves a reduction of the bandwidth of the non-guaranteed volume in the shared volumes (Step S304).

In contrast, if the Busy rate at Step S302 is less than 60% (No at Step S302) and if a reduction of the bandwidth is difficult at Step S303 (No at Step S303), the bandwidth management unit 102 sends a warning message to the operation terminal 3 (Step S305).

Figure 17:
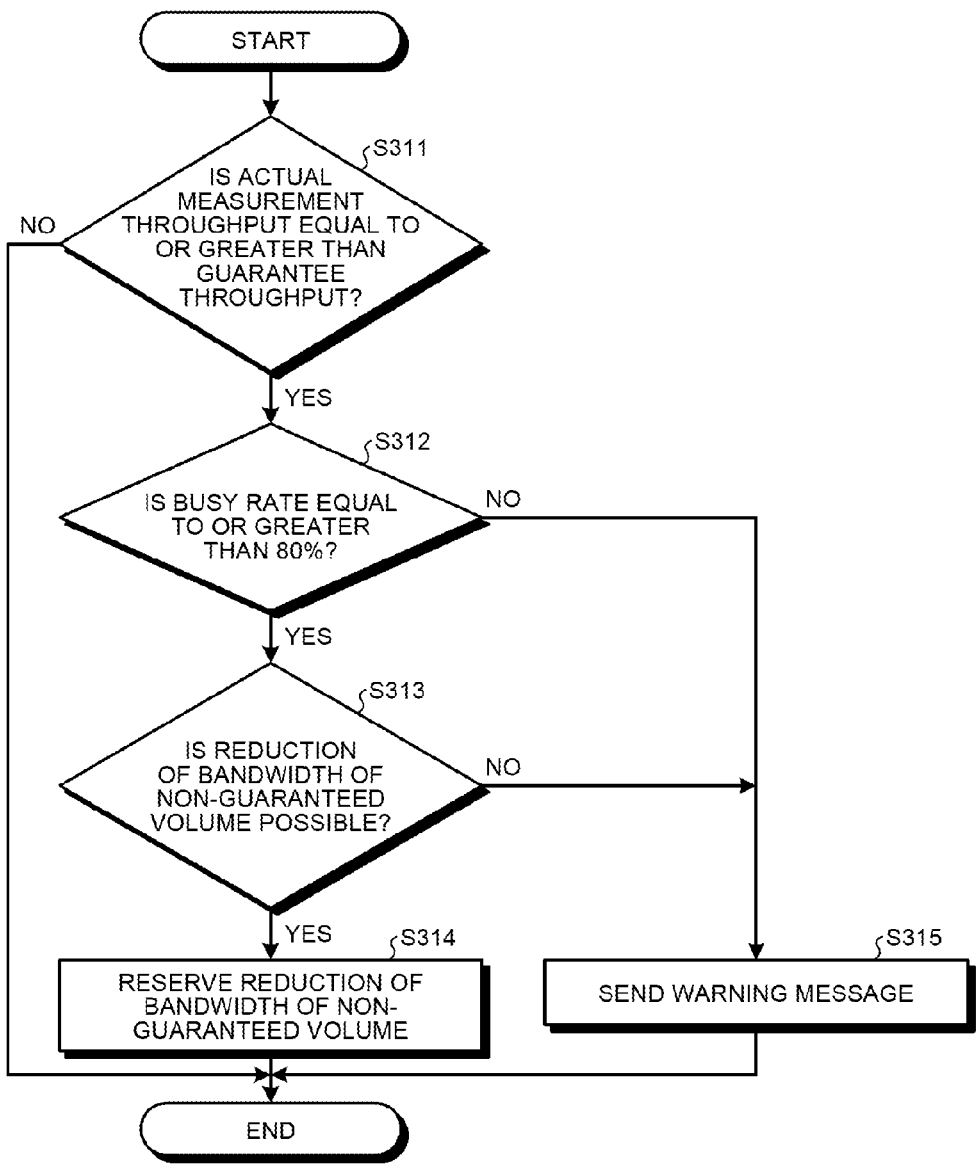
FIG. 17 is a flowchart illustrating a determination process of reservation of bandwidth adjustment when the throughput is guaranteed.

In the following, the flow of the determination process of reserving the bandwidth adjustment performed when the throughput is guaranteed will be described with reference to FIG. 17. FIG. 17 is a flowchart illustrating a determination process of reservation of bandwidth adjustment when the throughput is guaranteed.

The bandwidth management unit 102 determines whether the actual measurement throughput is equal to or greater than the guarantee throughput (Step S311). If the actual measurement throughput is less than the guarantee throughput (No at Step S311), the bandwidth management unit 102 ends the determination process of reserving the bandwidth adjustment.

In contrast, if the actual measurement throughput is equal to or greater than the guarantee throughput (Yes at Step S311), the bandwidth management unit 102 determines whether the Busy rate is equal to or greater than 80% (Step S312).

If the Busy rate is equal to or greater than 80% (Yes at Step S312), the bandwidth management unit 102 determines whether a reduction of the bandwidth of the non-guaranteed volume in the shared volumes is possible (Step S313).

If the reduction of the bandwidth is possible (Yes at Step S313), the bandwidth management unit 102 reserves a reduction of the bandwidth of the non-guaranteed volume in the shared volumes (Step S314).

In contrast, if the Busy rate is less than 80% at Step S312 (No at Step S312) and if a reduction of the bandwidth is difficult at Step S313 (No at Step S313), the bandwidth management unit 102 sends a warning message to the operation terminal 3 (Step S315).

Furthermore, here, a description has been given of a case in which a function is added to the first embodiment; however, in the third embodiment, the sacrifice volume may also be set similarly to the second embodiment. In a case in which the IOPS or the throughput is guaranteed, the process performed on the sacrifice volume is also the same as that performed in the second embodiment.

As described above, the operation management server according to the third embodiment can guarantee the IOPS or the throughput. Furthermore, the storage management device according to the third embodiment can also stably operate the system while adjusting the bandwidth even when guaranteeing the IOPS or the throughput.

(First Modification)

In the third embodiment described above, the upper limit of the Busy rate is not determined. However, if the Busy rate is excessively increased, the performance of the subject volume 232 is degraded. Accordingly, the operation management server 1 according to a first modification sets the upper limit of the Busy rate and expands the bandwidth if the Busy rate of the guaranteed volume reaches the upper limit. In the following, an operation of the bandwidth management unit 102 when the Busy rate reaches the upper limit will be described.

The bandwidth management unit 102 previously stores therein the upper limit value of the Busy rate. Then, if the guarantee IOPS is equal to or less than the actual measurement IOPS with respect to the guaranteed volume in which IOPS or the throughput is guaranteed, the bandwidth management unit 102 determines whether the Busy rate exceeds the upper limit value.

If the Busy rate does not exceed the upper limit value, the bandwidth management unit 102 ends the determination process of reserving the bandwidth adjustment.

In contrast, if the Busy rate exceeds the upper limit value and if a non-guaranteed volume in which the bandwidth can be reduced is present in the shared volumes, the bandwidth management unit 102 reserves a reduction of the bandwidth of the non-guaranteed volume. Furthermore, if no non-guaranteed volume in which the bandwidth can be reduced is present, the bandwidth management unit 102 sends a warning message to the operation terminal.

As described above, the operation management server according to the first modification reduces the bandwidth of another volume that affects the Busy rate if the Busy rate exceeds the upper limit value. Consequently, it is possible to avoid a reduction in the performance of the guaranteed volume due to a sharp increase in the load applied to the non-guaranteed volume.

Second Modification

Figure 18:
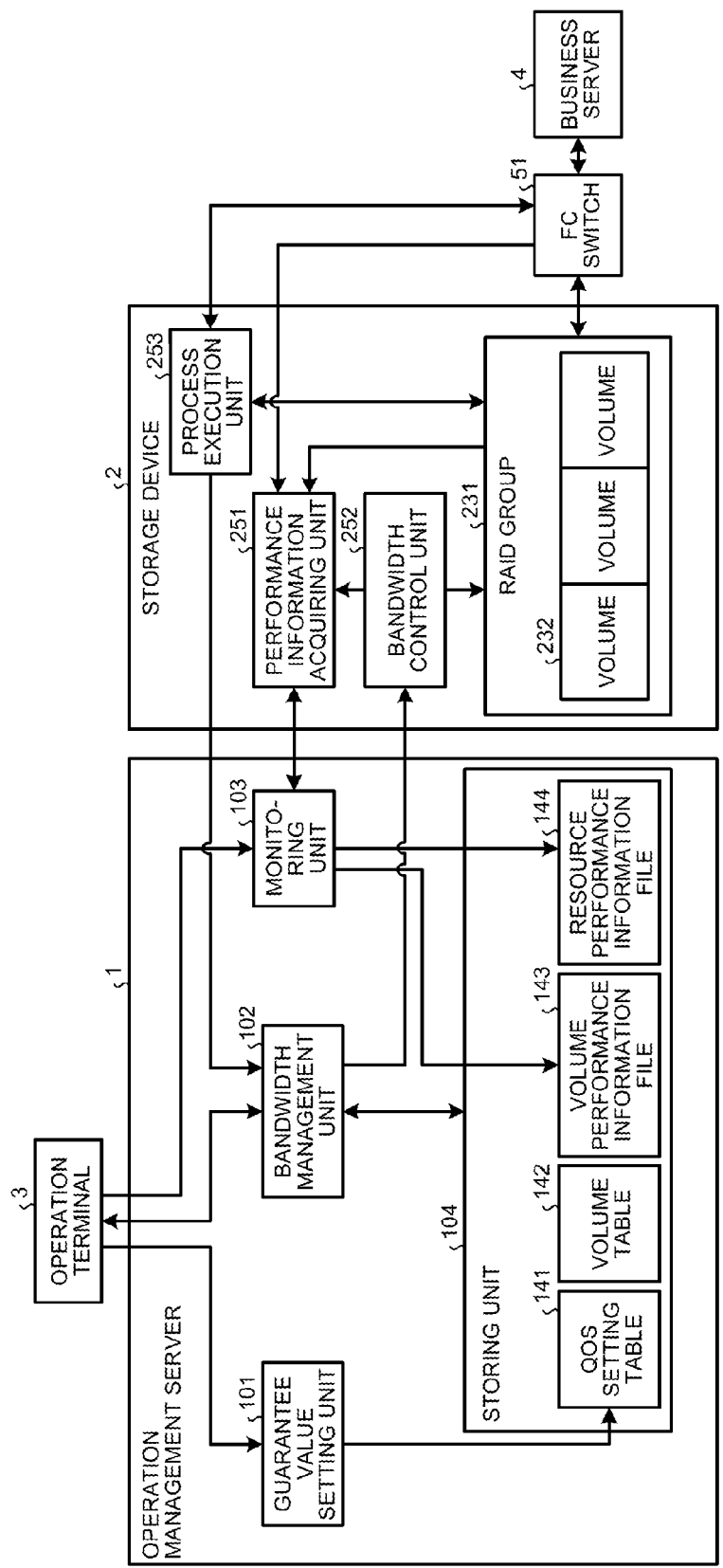
FIG. 18 is a block diagram illustrating an operation management server and a storage device according to a second modification of a third embodiment.

In the third embodiment, the Busy rate of a disk is calculated by dividing the total read/write time in a predetermined time period with respect to the disk 203 by the predetermined time period. However, the disk can multiply perform an input/output (IO) process. Thus, for example, even if the Busy rates are the same, the amount of the load at the time of 10 multiple execution is different from that at the time of single multiple execution. Accordingly, in a second modification, the maximum band use state is determined by taking into consideration the multiplicity of the disks 203. FIG. 18 is a block diagram illustrating an operation management server and a storage device according to a second modification of a third embodiment.

Figures 19, 20:
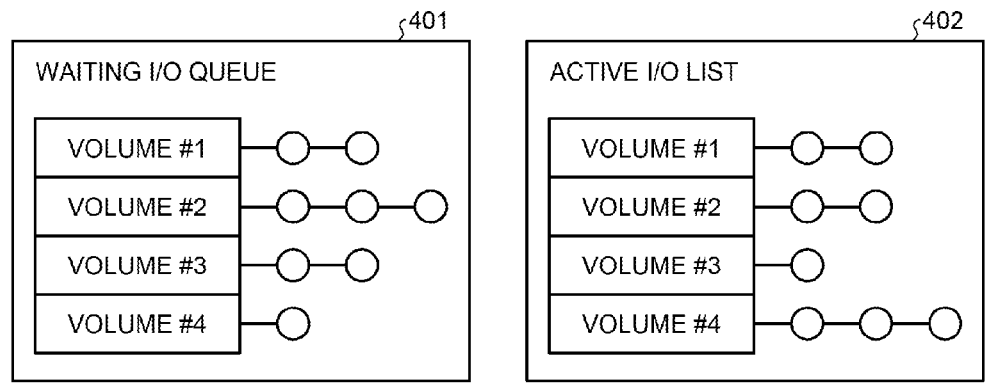
FIG. 19 is a schematic diagram illustrating an example of a waiting I/O queue and an active I/O list.
FIG. 20 is a schematic diagram illustrating an example of a band limitation table.

The process execution unit 253 is implemented by the CMs 201 and 202 illustrated in FIG. 2. The process execution unit 253 holds a waiting I/O queue 401 and an active I/O list 402 illustrated in FIG. 19. FIG. 19 is a schematic diagram illustrating an example of a waiting I/O queue and an active I/O list. The information on the volumes 232 is stored in the waiting I/O queue 401 and the active I/O list 402 and, furthermore, the circle connected to each of the volumes 232 represents a command with respect to the subject volume 232. Namely, in practice, a command is stored in the location indicated by the circle illustrated in FIG. 19.

The waiting I/O queue 401 is a queue that is used for a band limitation and an amount of queuing is determined on the basis of an amount of the band limitation of a QoS.

In contrast, the active I/O list 402 represents the commands that have already been output from the process execution unit 253 to the disks 203. Namely, the line of commands connected to each of the volumes 232 in the active I/O list 402 indicates the retained commands that are too many to be processed by the disks 203. Namely, in the active I/O list 402, an amount of queuing is determined by the throughput of the disks 203 regardless of the band limitation function of the QoS. Namely, it is possible to identify, on the basis of the number of commands retained in the active I/O list, an amount of the process of each of the volumes 232 is retained.

For the guaranteed volume selected by the second selection, the bandwidth management unit 102 acquires, from the process execution unit 253, the number of commands retained in the active I/O list 402. Hereinafter, the number of the acquired commands is referred to as "the number of accumulated commands".

If the type of the performance guarantee of the guaranteed volume selected by the second selection is the IOPS, the bandwidth management unit 102 compares the guarantee IOPS with the actual measurement IOPS. If the guarantee IOPS is equal to or less than the actual measurement IOPS, the bandwidth management unit 102 determines that the performance is guaranteed and does not perform the band adjustment of the guaranteed volume selected by the second selection.

In contrast, if the guarantee IOPS is greater than the actual measurement IOPS, the bandwidth management unit 102 determines whether the number of accumulated commands of the guaranteed volume selected by the second selection is equal to or greater than a certain number. If the number of accumulated commands is equal to or greater than the certain number, the bandwidth management unit 102 reserves a reduction of the bandwidth of the non-guaranteed volume. However, if no non-guaranteed volume in which the bandwidth can be reduced is present, the bandwidth management unit 102 sends a warning message to the operation terminal 3.

In contrast, if the number of accumulated commands is less than the certain number, the bandwidth management unit 102 determines that the performance guarantee is difficult and sends a warning message to the operation terminal 3.

Furthermore, if the type of the performance guarantee of the guaranteed volume selected by the second selection is the throughput, similarly to the case of the IOPS, the bandwidth management unit 102 also decides to reserve the bandwidth adjustment. However, the certain number that is used to determine the number of accumulated commands may also be different from that of the IOPS.

Furthermore, in the above description, the bandwidth management unit 102 performs the determination by only using the number of accumulated commands; however, the bandwidth management unit 102 may also reserve a reduction of the bandwidth of the non-guaranteed volume when one of the Busy rate and the number of accumulated commands equal to or greater than the certain number is equal to or greater than a certain rate. Furthermore, the bandwidth management unit 102 may also reserve a reduction of the bandwidth of the non-guaranteed volume when both the Busy rate and the number of accumulated commands equal to or greater than the certain number is equal to or greater than a certain rate.

As described above, the operation management server according to the second modification determines the maximum band use state by using the number of retained commands that are too many to be processed by the disks. Consequently, the maximum band use state can be more accurately determined and thus the system can be more reliably and stably operated.

Third Modification

In an operation management server according to a third modification, even if the performance of one of the IOPS and the throughput is guaranteed, the IOPS and the throughput are simultaneously specified as the guarantee performance. Then, the band limit width is expanded if the band limitation is performed by the performance that is different from the performance targeted for the guarantee. In a description below, the description will be given of a case in which the IOPS or the throughput is guaranteed.

An operator specifies, by using the operation terminal 3, a guaranteed volume that guarantees the performance. Furthermore, the operator inputs, for each guaranteed volume, information on the type of the performance guarantee indicating which one of the IOPS, the throughput, and the response time is guaranteed. In the embodiment, it is assumed that the IOPS or the throughput has been input. Furthermore, in accordance with a band limitation table 403 illustrated in FIG. 20, the operator inputs a performance set value that satisfies a desired guarantee value from the operation terminal 3. FIG. 20 is a schematic diagram illustrating an example of a band limitation table. The operation terminal 3 sends, to the guarantee value setting unit 101, the identification information on the guaranteed volume, the information on the type of performance guarantee, and a performance set value.

The guarantee value setting unit 101 receives, from the operation terminal 3, the identification information on the guaranteed volume, the information on the type of the performance guarantee, and the performance set value. Then, the guarantee value setting unit 101 registers, in the QoS setting table 141, the identification information on the guaranteed volume, the information on the type of the performance guarantee, and the performance set value.

The bandwidth management unit 102 stores therein the band limitation table 403 illustrated in FIG. 20. Then, the bandwidth management unit 102 acquires, from the QoS setting table 141, the type of the performance guarantee of each of the guaranteed volumes and the performance set values.

First, the bandwidth management unit 102 acquires, by using the performance set value from the band limitation table 403, a guarantee value associated with the type of the performance guarantee. Then, similarly to the third embodiment, the bandwidth management unit 102 performs the first selection and the second selection. Then, the bandwidth management unit 102 specifies, for the guaranteed volume selected by the second selection, the band limit width that is the minimum and that is equal to or greater than the guarantee value.

Then, the bandwidth management unit 102 acquires, from the process execution unit 253, the delay time of the guaranteed volume selected by the second selection. In the following, the delay time will be described. The QoS on the hard side executed by the process execution unit 253 accumulates the number of times of the access requests to each of the volumes 232 and an amount of the data transfer requests. If the accumulated amount reaches a specified number of times or a specified amount in a predetermined period (in the embodiment, ⅟60 seconds), the QoS on the hard side does not perform the process on the subsequent request for ⅟60 seconds and retains the requests in a queue. Then, when ⅟60 seconds have elapsed, the QoS on the hard side resumes the processes retained in the queue. Consequently, the QoS on the hard side narrows down the data transfer amount. The time for which the requests are retained in this queue corresponds to a delay time. If the delay time is greater than zero, the QoS on the hard side performs the band limitation. Furthermore, if the delay time is zero, the QoS on the hard side does not perform the band limitation. Accordingly, if the delay time is zero, the performance is not improved even if the bandwidth is further expanded.

The bandwidth management unit 102 determines whether the delay time is zero. If the delay time is not zero, the bandwidth management unit 102 determines that the bandwidth limitation is performed on the guaranteed volume selected by the second selection. Furthermore, if the state does not reach the guarantee performance, the bandwidth management unit 102 performs the following process in accordance with the type of guarantee performance.

If the IOPS is guaranteed, the bandwidth management unit 102 calculates, from the performance set value, the IO size (hereinafter, referred to as a "predetermined IO size") that is used for the determination. For example, if a performance set value is 5, the bandwidth management unit 102 calculates 400 MB/s×102÷5040/s and obtains that a predetermined IO size is about 81.27 KB. Then, if the actual measurement IOPS exceeds the IO size, the bandwidth management unit 102 determines that the IOPS is not guaranteed due to the band limitation that is performed due to the throughput.

Furthermore, if the throughput is guaranteed, similarly to the case of the IOPS, the bandwidth management unit 102 calculates a predetermined IO size from the performance set value. If the actual measurement IO size is less than the predetermined IO size, the bandwidth management unit 102 determines that the throughput is not guaranteed due to the band limitation caused by the IOPS.

Furthermore, in a case other than the above, the bandwidth management unit 102 determines that the performance is guaranteed. In such a case, the bandwidth management unit 102 ends the process of the bandwidth adjustment.

If the bandwidth management unit 102 determines that the performance is not guaranteed, the bandwidth management unit 102 expands the bandwidth of the guaranteed volume selected by the second selection such that the actual measurement IO size approaches the predetermined IO size.

After the bandwidth has been expanded, if the delay time of the guaranteed volume with the expanded bandwidth is not zero, the bandwidth management unit 102 again performs the expansion process of the above described bandwidth. In contrast, if the delay time of the guaranteed volume with the expanded bandwidth is zero and does not reach the guarantee performance, the bandwidth management unit 102 performs the adjustment process on the bandwidth by using the determination that is performed by using the Busy rate described in the third embodiment.

As described above, the operation management server according to the third modification can reliably guarantee, when limit values of the IOPS and the throughput are specified by a single index, one of the performance in which performance guarantee is specified.

According to an aspect of an embodiment of the storage management device, performance adjustment method, and the performance adjustment program disclosed in the present invention, an advantage is provided in that a system is stably operated while the bandwidth is adjusted.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A storage management device comprising:
   a processor and a memory,
   the memory stores therein a guarantee value of data send/receive performance with respect to a predetermined storage area in a plurality of storage areas held by a storage device; and
   the processor is configured to obtain a normal distribution of the actual measurement value, change average and dispersion of the obtained normal distribution such that a percentage of deviation of the guarantee value is equal to or less than a predetermined value, allocate, based on the interim target value, a bandwidth that compensates a difference between the guarantee value and the actual measurement value with respect to the predetermined storage area, determine band distribution with respect to each of the plurality of storage areas, and instruct the memory to adjust the bandwidth in accordance with the determined band distribution.

2. The storage management device according to claim 1, wherein the bandwidth management unit calculates, based on the difference between the guarantee value and the actual measurement value, the interim target value.

3. The storage management device according to claim 1, wherein the memory stores therein a target value that is adjustment target of the data send/receive performance with respect to another storage area, and the processor is configured to use, when a surplus bandwidth used for allocation in order to achieve the guarantee value is not present, the bandwidth allocated to the other storage area for allocation of the bandwidth of the predetermined storage area and use, when the surplus bandwidth used for allocation in order to achieve the guarantee value is present, the remaining bandwidth allocated to the predetermined storage area in the surplus bandwidth for allocation of the bandwidth of the other storage area so as to achieve the target value, upon allocating the bandwidth with respect to the predetermined storage area.

4. The storage management device according to claim 1, wherein the processor is configured to calculate a busy rate of a transmission source that is used by the predetermined storage area and reduces the bandwidth of storage areas other than the predetermined storage area in the plurality of storage areas such that a value of the highest busy rate is equal to or less than a predetermined value.

5. A performance adjustment method comprising:

acquiring a guarantee value of data send/receive performance with respect to a predetermined storage area in a plurality of storage areas held by a memory;

obtaining, using a processor, a normal distribution of the actual measurement value;

changing, using the processor, average and dispersion of the obtained normal distribution such that a percentage of deviation of the guarantee value is equal to or less than a predetermined value;

allocating, using the processor, based on the interim target value, a bandwidth that compensates a difference between the guarantee value and the actual measurement value with respect to the predetermined storage area and determining band distribution with respect to each of the plurality of storage areas; and instructing, using the processor, the memory device to adjust the bandwidth in accordance with the determined band distribution.

6. A non-transitory computer-readable recording medium having stored therein a performance adjustment program that causes a computer to execute a process comprising:

acquiring a guarantee value of data send/receive performance with respect to a predetermined storage area in a plurality of storage areas held by a memory;

obtaining a normal distribution of the actual measurement value, changing average and dispersion of the obtained normal distribution such that a percentage of deviation of the guarantee value is equal to or less than a predetermined value;

allocating, based on the interim target value, a bandwidth that compensates a difference between the guarantee value and the actual measurement value with respect to the predetermined storage area and determining band distribution with respect to each of the plurality of storage areas; and instructing the memory to adjust the bandwidth in accordance with the determined band distribution.

* * * * *